United States Patent
Endo et al.

(10) Patent No.: US 7,388,982 B2
(45) Date of Patent: Jun. 17, 2008

(54) IMAGE PROCESSING METHOD AND APPARATUS FOR GENERATING PANORAMIC IMAGE

(75) Inventors: Takaaki Endo, Chiba (JP); Akihiro Katayama, Kanagawa (JP); Masahiro Suzuki, Kanagawa (JP); Daisuke Kotake, Kanagawa (JP); Yukio Sakagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 876 days.

(21) Appl. No.: 10/721,875

(22) Filed: Nov. 26, 2003

(65) Prior Publication Data
US 2004/0228544 A1    Nov. 18, 2004

(30) Foreign Application Priority Data
Nov. 29, 2002    (JP) ............................. 2002-348727

(51) Int. Cl.
*G06K 9/00*    (2006.01)
(52) U.S. Cl. ...................................... 382/154
(58) Field of Classification Search .................. None
See application file for complete search history.

(56) References Cited

U.S. PATENT DOCUMENTS

| | | | |
|---|---|---|---|
| 6,335,754 B1 | 1/2002 | Endo et al. | 348/37 |
| 6,754,379 B2* | 6/2004 | Xiong et al. | 382/154 |
| 6,983,082 B2* | 1/2006 | Duiker | 382/284 |
| 2003/0021462 A1* | 1/2003 | Sakai et al. | 382/144 |
| 2003/0080975 A1 | 5/2003 | Kuroki et al. | 345/629 |
| 2003/0142115 A1 | 7/2003 | Endo et al. | 345/633 |

FOREIGN PATENT DOCUMENTS

| | | |
|---|---|---|
| JP | 11-168754 | 6/1999 |
| JP | 11-234501 | 8/1999 |
| JP | 11-289447 | 10/1999 |

OTHER PUBLICATIONS

T. Endo et al,; "Method of Generating Image-Based Cybercites By Using Vehicle-Mounted Cameras"; (IEICE Society, PA-3-4-, pp. 276-277, 1997).

M. Hirose et al. ; "Building Image-Based Cybercities By Using Vehicle-Mounted Cameras (2)—Generation of Wide-Range Virtual Environment by Using Photorealistic Images"; (Proc. of the Virtual Reality Society of Japan, vol. 2, pp. 67-70, 1997).

* cited by examiner

*Primary Examiner*—Matthew C Bella
*Assistant Examiner*—Alex Liew
(74) *Attorney, Agent, or Firm*—Fitzpatrick, Cella, Harper & Scinto

(57) ABSTRACT

There are disclosed an image processing method and apparatus for generating a panoramic image in which the hue or brightness discontinuities generated at the seams of source images are reduced. According to the image processing method of this invention, upon compositing source images (221, 222) having an overlap portion, the hue or brightness of each source image is converted (H211, H221) using a reference image which has overlap portions with both the source images to be composited, and the converted images (241, 242) are composited, thereby reducing the hue or brightness discontinuities generated at the seam of images.

4 Claims, 21 Drawing Sheets

F I G. 10
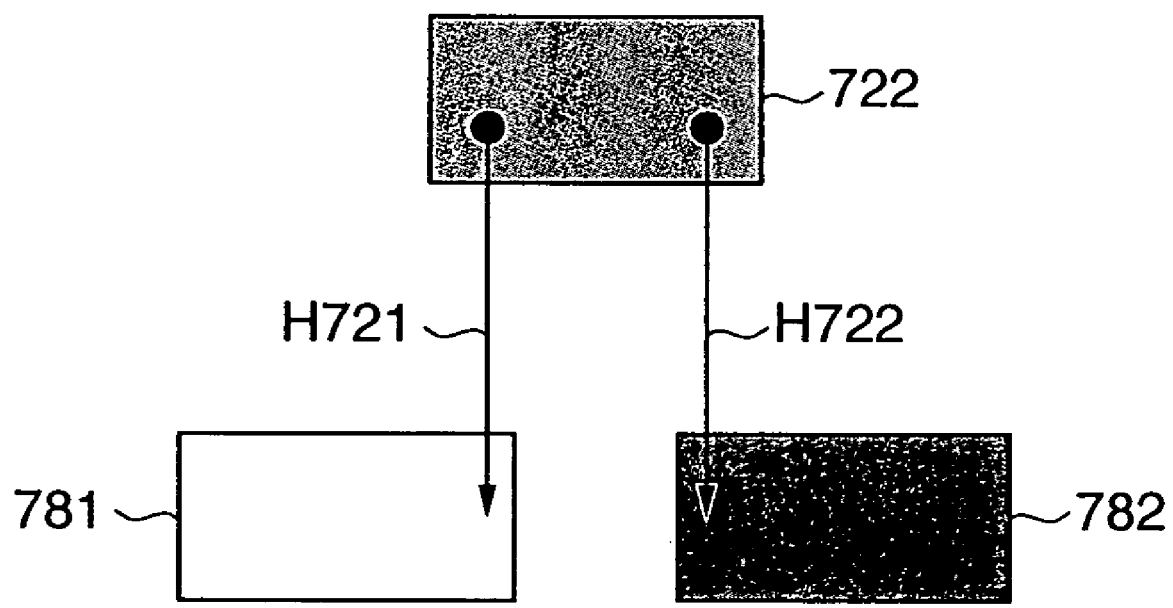

FIG. 11
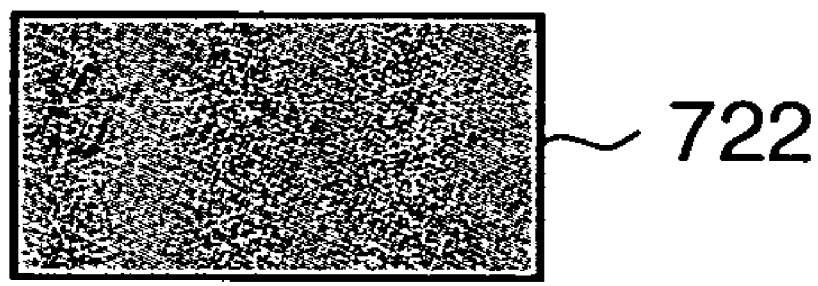
722
H72
742

FIG. 21
1722
H172
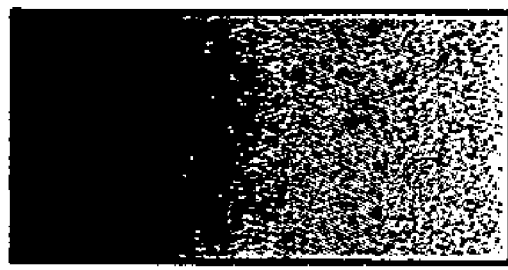
1742

IMAGE PROCESSING METHOD AND APPARATUS FOR GENERATING PANORAMIC IMAGE

FIELD OF THE INVENTION

The present invention relates to an image processing technique for generating a panoramic image by compositing a plurality of images and, more particularly, to an image processing technique which can reduce hue or brightness discontinuities at the seams of source images.

BACKGROUND OF THE INVENTION

An attempt has been made to sense a real space by an image sensing apparatus mounted on a mobile, and to express the sensed real space as a virtual space using a computer on the basis of the sensed photo-realistic image data (see, e.g., Endo, Katayama, Tamura, Hirose, Watanabe, & Tanikawa: "Method of Generating Image-Based Cybercities By Using Vehicle-Mounted Cameras" (IEICE Society, PA-3-4, pp. 276-277, 1997), or Hirose, Watanabe, Tanikawa, Endo, Katayama, & Tamura: "Building Image-Based Cybercities By Using Vehicle-Mounted Cameras (2)-Generation of Wide-Range Virtual Environment by Using Photo-realistic Images—" (Proc. of the Virtual Reality Society of Japan, Vol.2, pp. 67-70, 1997), and the like).

As a method of expressing a sensed real space as a virtual space on the basis of photo-realistic image data sensed by an image sensing apparatus mounted on a mobile, a method of reconstructing a geometric model of the real space on the basis of the photo-realistic image data, and expressing the virtual space using a conventional CG technique is known. However, this method has limits in terms of the accuracy, exactitude, and reality of the model. On the other hand, an Image-Based Rendering (IBR) technique that expresses a virtual space using a photo-realistic image without any reconstruction using a model has attracted attention. The IBR technique generates an image viewed from an arbitrary viewpoint on the basis of a plurality of photo-realistic images. Since the IBR technique is based on photo-realistic images, it can express a realistic virtual space.

In order to build a virtual space that allows walkthrough using such IBR technique, an image must be generated and presented in correspondence with the position in the virtual space of the user (who experiences walkthrough). For this reason, in such system, respective frames of photo-realistic image data and positions in the virtual space are saved in correspondence with each other, and a corresponding frame is acquired and reproduced on the basis of the user's position and visual axis direction in the virtual space.

As a method of acquiring position data in a real space, a positioning system using an artificial satellite such as GPS (Global Positioning System) used in a car navigation system or the like is generally used. As a method of determining correspondence between position data obtained from the GPS or the like and photo-realistic image data, a method of determining the correspondence using a time code has been proposed (Japanese Patent Laid-Open No. 11-168754). With this method, the correspondence between respective frame data of photo-realistic image data and position data is determined by determining the correspondence between time data contained in position data, and time codes appended to the respective frame data of photo-realistic image data.

The walkthrough process in such virtual space allows the user to view a desired direction at each position. For this purpose, images at respective positions may be saved as a panoramic photo-realistic image that can cover a broader range than the field angle upon reproduction, and a partial image to be reproduced may be extracted from the panoramic photo-realistic image on the basis of the user's position and visual axis direction in the virtual space, and the extracted partial image may be displayed.

Conventionally, in order to obtain a panoramic photo-realistic image, for example, a plurality of cameras are used. In general, a plurality of cameras are arranged in a radial pattern so that their visual fields can cover a desired visual field (e.g., a full-view (360°) visual field or the like). Images obtained by the respective cameras are temporarily stored in a storage device using, e.g., an optical or magnetic storage medium.

Then, by joining images sensed by the respective cameras at a given position, a panoramic photo-realistic image at that position can be obtained. In this case, in order to reduce hue or brightness discontinuities generated at the seams of neighboring images sensed by the respective cameras, overlapping portions of images sensed by neighboring cameras are continuously blended.

As a data format of a panoramic photo-realistic image, broad visual field (including a full view) images at an identical time from one viewpoint are preferably used. In order to sense such images, an apparatus, which senses images reflected by respective surfaces of a pyramid mirror by a single camera, is used. FIG. 3 shows an example of such apparatus.

As shown in FIG. 3, a pyramid mirror 12 is made up of plane mirrors as many as a plurality of cameras which form a camera unit 11. Each of the cameras which form the camera unit 11 senses a surrounding visual scene reflected by the corresponding plane mirror. If the cameras are laid out so that the virtual images of the lens centers of the respective cameras formed by the plane mirrors match, images can be sensed at an identical time from one viewpoint. Hence, by compositing the images sensed by the respective cameras, a full-view panoramic image at an identical time from a single viewpoint can be generated.

However, since the image sensing apparatus shown in FIG. 3 forms nearly no overlapping portions between images sensed by the cameras corresponding to neighboring plane mirrors, the conventional method that reduces hue or brightness discontinuities using the overlapping portions upon compositing images cannot be applied, and the seams of the images stand out.

SUMMARY OF THE INVENTION

The present invention has been made in consideration of the aforementioned problems, and has as its principal object to reduce hue or brightness discontinuities generated at the seams of source images in a composite image generated by compositing a plurality of images.

According to an aspect to the present invention, an image processing method for generating a composite image by compositing a plurality of source images, each of which has an overlapping portion with at least one another source image, comprising: a reference image acquisition step of acquiring a reference image which has overlapping portions with both of one of the source images, and another source image to be composited with that source image; a conversion generation step of generating conversions based on a hue or brightness level of the reference image for the one of the source images, and the other source image to be composited with that source image; a conversion step of converting the one of the source images, and the other source image to be composited with that source image on the basis of the generated conversions; and a composition step of generating the composite image by compositing the one of the source images, and the other source image to be composited with that source image, which have been converted.

According to another aspect of the present invention, an image processing method for generating a panoramic image by compositing first and second images, comprising: acquiring the first and second images, and a reference image which has overlapping portions with both of the first and second images; calculating a first conversion condition required to adjust a hue or brightness level of the first image to a hue or brightness level of the reference image; calculating a second conversion condition required to adjust a hue or brightness level of the second image to the hue or brightness level of the reference image; and generating the panoramic image by compositing an image obtained by converting the first image on the basis of the first conversion condition, and an image obtained by converting the second image on the basis of the second conversion condition.

According to still another aspect of the present invention, a computer readable storage medium storing a computer program that makes a computer execute an image processing method for generating a composite image by compositing a plurality of source images, each of which has an overlapping portion with at least one another source image, the computer program comprising: a program of a reference image acquisition step of acquiring a reference image which has overlapping portions with both of one of the source images, and another source image to be composited with that source image; a program of a conversion generation step of generating conversions based on a hue or brightness level of the reference image for the one of the source images, and the other source image to be composited with that source image; a program of a conversion step of converting the one of the source images, and the other source image to be composited with that source image on the basis of the generated conversions; and a program of a composition step of generating the composite image by compositing the one of the source images, and the other source image to be composited with that source image, which have been converted.

According to still another aspect of the present invention, an image processing apparatus for generating a composite image by compositing a plurality of source images, each of which has an overlapping portion with at least one another source image, comprising: reference image acquisition unit adapted to acquire a reference image which has overlapping portions with both of one of the source images, and another source image to be composited with that source image; conversion generation unit adapted to generate conversions based on a hue or brightness level of the reference image for the one of the source images, and the other source image to be composited with that source image; conversion unit adapted to convert the one of the source images, and the other source image to be composited with that source image on the basis of the generated conversions; and composition unit adapted to generate the composite image by compositing the one of the source images, and the other source image to be composited with that source image, which have been converted.

According to still another aspect of the present invention, a computer readable storage medium storing a computer program that makes a computer execute an image processing method for generating a panoramic image by compositing first and second images, the computer program comprising: a program of a step of acquiring the first and second images, and a reference image which has overlapping portions with both of the first and second images; a program of a step of calculating a first conversion condition required to adjust a hue or brightness level of the first image to a hue or brightness level of the reference image; a program of a step of calculating a second conversion condition required to adjust a hue or brightness level of the second image to the hue or brightness level of the reference image; and a program of a step of generating the panoramic image by compositing an image obtained by converting the first image on the basis of the first conversion condition, and an image obtained by converting the second image on the basis of the second conversion condition.

According to still another aspect of the present invention, an image processing apparatus for generating a panoramic image by compositing first and second images, comprising: acquiring unit adapted to acquire the first and second images, and a reference image which has overlapping portions with both of the first and second images; first calculating unit adapted to calculate a first conversion condition required to adjust a hue or brightness level of the first image to a hue or brightness level of the reference image; second calculating unit adapted to calculate a second conversion condition required to adjust a hue or brightness level of the second image to the hue or brightness level of the reference image; and generating unit adapted to generate the panoramic image by compositing an image obtained by converting the first image on the basis of the first conversion condition, and an image obtained by converting the second image on the basis of the second conversion condition.

According to still another aspect of the present invention, an image processing method for generating a full-view panoramic image by compositing a plurality of images each of which has overlapping portions with neighboring images, comprising: acquiring, when an arbitrary one of the plurality of images is defined as a first image, and images to be composited as right and left neighboring images of the first image are defined as second and third images, a first reference image having overlapping portions with both the first and second images, and a second reference image having overlapping portions with both the first and third images; calculating first and second conversion conditions required to adjust a hue or brightness level of the first image to hue or brightness levels of the first and second reference images; generating a converted image by converting a left predetermined region of the first image on the basis of the first conversion condition and converting a right predetermined region of the first image on the basis of the second conversion condition; and generating a full-view panoramic image by compositing the converted images generated for all of the plurality of images.

According to still another aspect of the present invention, a computer readable storage medium storing a computer program that makes a computer execute an image processing method for generating a full-view panoramic image by compositing a plurality of images each of which has overlapping portions with neighboring images, the computer program comprising: a program of a step of acquiring, when an arbitrary one of the plurality of images is defined as a first image, and images to be composited as right and left neighboring images of the first image are defined as second and third images, a first reference image having overlapping portions with both the first and second images, and a second reference image having overlapping portions with both the first and third images; a program of a step of calculating first and second conversion conditions required to adjust a hue or brightness level of the first image to hue or brightness levels of the first and second reference images; a program of a step of generating a converted image by converting a left predetermined region of the first image on the basis of the first conversion condition and converting a right predetermined region of the first image on the basis of the second conversion condition; and a program of a step of generating a full-view panoramic image by compositing the converted images generated for all of the plurality of images.

According to still another aspect of the present invention, an image processing method for generating a full-view panoramic image by compositing a plurality of images each of which has overlapping portions with neighboring images, comprising: acquiring unit adapted to, when an arbitrary one of the plurality of images is defined as a first image, and images to be composited as right and left neighboring images of the first image are defined as second and third images, acquire a first reference image having overlapping portions with both the first and second images, and a second reference image having overlapping portions with both the first and third images; calculating unit adapted to calculate first and second conversion conditions required to adjust a hue or brightness level of the first image to hue or brightness levels of the first and second reference images; first generating unit adapted to generate a converted image by converting a left predetermined region of the first image on the basis of the first conversion condition and converting a right predetermined region of the first image on the basis of the second conversion condition; and second generating unit adapted to generate a full-view panoramic image by compositing the converted images generated for all of the plurality of images.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view for explaining a conversion process in modification 1 of the first embodiment of the present invention;

FIG. 11 is a view for explaining a conversion process in modification 1 of the first embodiment of the present invention;

FIG. 21 is a view for explaining a conversion process in modification 1 of the second embodiment of the present invention.

DETAILED DESCRIPTION OF THE PREFERRED EMBODIMENTS

Preferred embodiments of the present invention will now be described in detail in accordance with the accompanying drawings.

The present invention is directed to an image processing method for generating a composite image by compositing a plurality of source images, each of which has an overlapping portion with at least one another source image, comprising: acquiring a reference image which has overlapping portions with both of one of the source images, and another source image to be composited with that source image; generating conversions based on a hue or brightness level of the reference image for the one of the source images, and the other source image to be composited with that source image; converting the one of the source images, and the other source image to be composited with that source image on the basis of the generated conversions; and generating the composite image by compositing the one of the source images, and the other source image to be composited with that source image, which have been converted.

Such invention can be implemented in correspondence with the following embodiments in the arrangements practically shown in FIGS. 1 to 21.

First Embodiment

This embodiment is characterized in that a reference image is an image which is sensed at the same time as one of source images and another source image to be composited with that source image. More specifically, since a panoramic image is generated using an image sensed using a hue or brightness reference camera in addition to panorama source images, which are sensed by a plurality of cameras, even when neighboring panorama source images have small overlapping portions, a panoramic image in which hue or brightness discontinuities generated at the seams of source images can be reduced is realized.

Note that this embodiment is particularly effective for generation of a panoramic image using images with small overlapping portions. However, the present invention can also be applied to images with large overlapping portions, and the same effect can be obtained.

Figure 1:
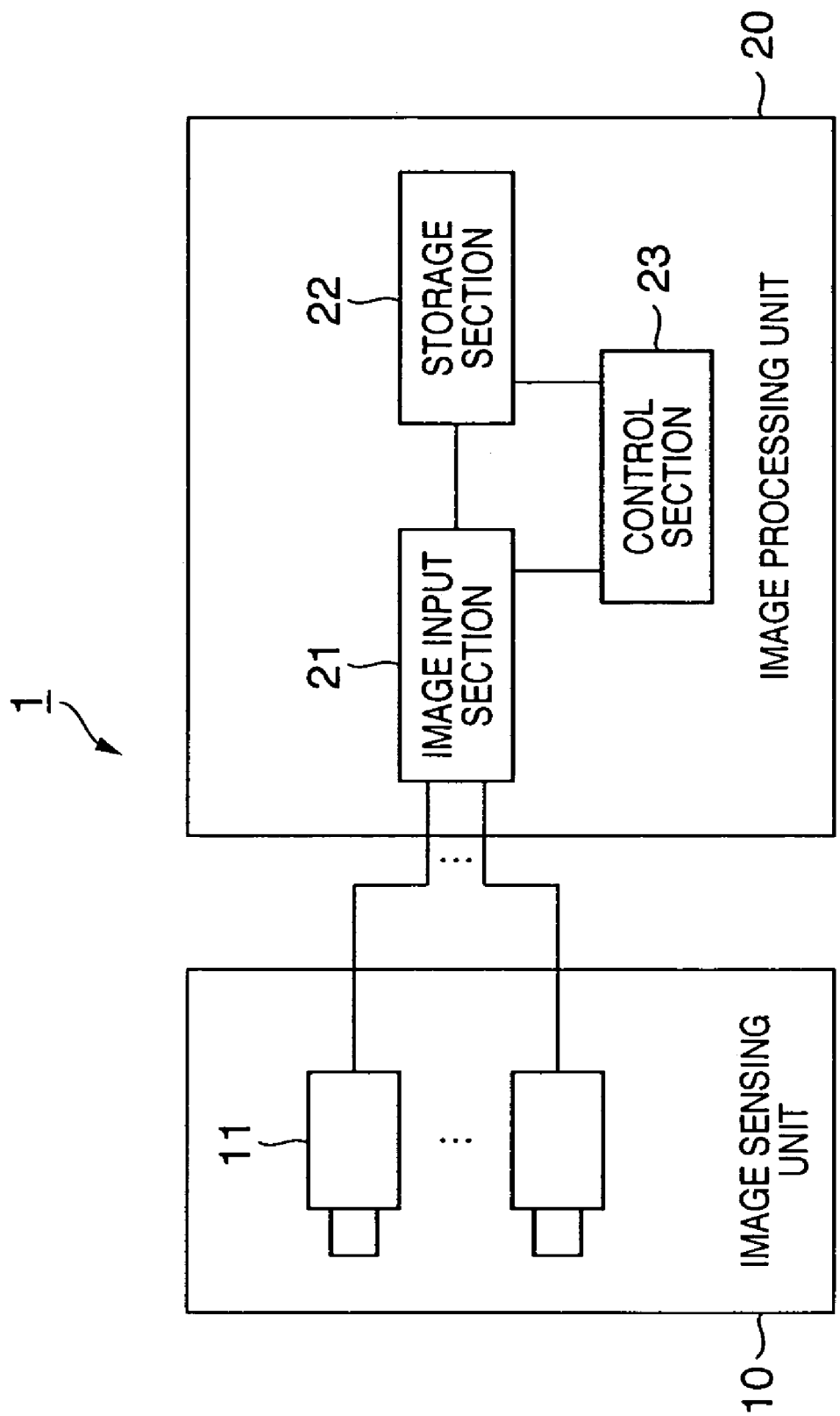
FIG. 1 is a block diagram showing an example of the arrangement of an image processing system according to an embodiment of the present invention.

As shown in FIG. 1, an image processing system 1 according to this embodiment comprises an image sensing unit 10 for sensing images as sources of a panoramic image, and an image processing unit 20 for generating a panoramic image using the sensed images. However, if images required to generate a panoramic image are sensed in advance, the image sensing unit 10 is not always required.

The image sensing unit 10 includes a plurality of cameras 11, and has an arrangement obtained by adding a reference camera as a characteristic feature of this embodiment to the basic arrangement that senses a predetermined visual field using a plurality of cameras whose visual fields to be sensed partially overlap each other.

The image processing unit 20 has an image input section 21 which receives image signals sensed by the image sensing unit 10, and executes signal processes such as A/D conversion and the like, a storage section 22 which stores sensed images, an application program, and the like, and a control section 23 which controls the overall image processing unit 20.

In this embodiment, the control section 23 can be implemented by a versatile computer such as a personal computer or the like, which can be connected to a computer network.

Figure 2:
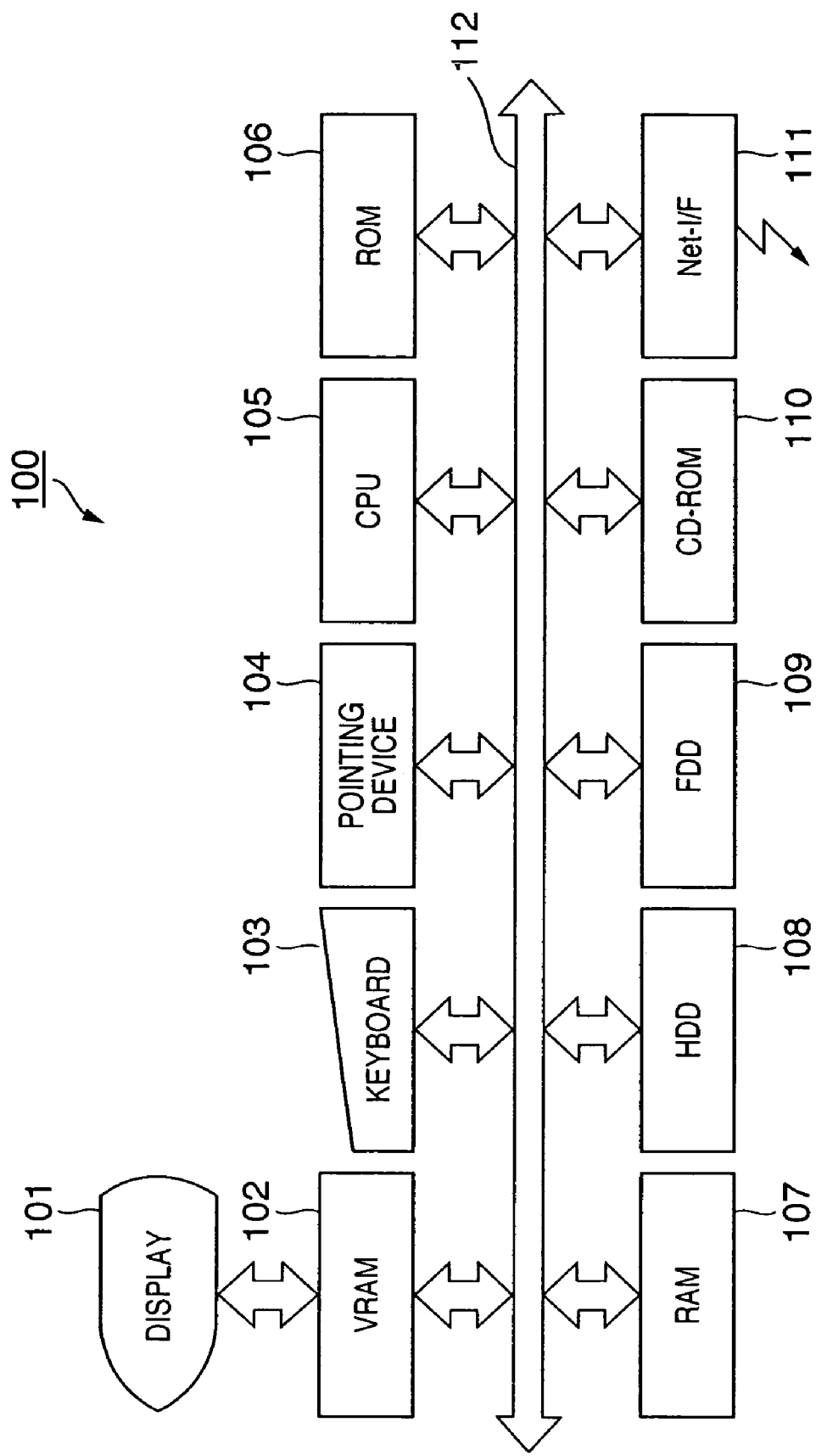
FIG. 2 is a block diagram showing an example of the arrangement of a computer which can be used as a control section 23 or an image processing unit in FIG. 1.

FIG. 2 is a block diagram showing an example of the arrangement of a computer apparatus which can be used as the control section 23 in this embodiment.

Referring to FIG. 2, reference numeral 101 denotes a display which displays information of data whose process is in progress by the application program, various messages and menus, and the like. The display 101 comprises a CRT (Cathode Ray Tube), LCD (Liquid Crystal Display), or the like. Reference numeral 102 denotes a video RAM (to be referred to as a VRAM hereinafter) on which an image to be displayed on the screen of the display 101 is rasterized. Reference numerals 103 and 104 respectively denote a keyboard and pointing device, which are used to input characters and the like on the screen, to point to icons, buttons, and the like on a GUI (Graphical User Interface), and so forth. Reference numeral 105 denotes a CPU which controls the overall computer apparatus.

Reference numeral 106 denotes a ROM (Random Access Memory) which stores an operation processing sequence (program) of the CPU 105. Note that the ROM 106 also stores application programs associated with various data processes, an error processing program, and programs associated with the flow charts to be described later. Reference numeral 107 denotes a RAM (Random Access Memory) which is used as a work area when the CPU 105 executes various programs described above, a temporary save area upon an error process, and the like.

Reference numeral 108 denotes a hard disk drive (to be abbreviated as an HDD hereinafter); and 109, a floppy disk drive (to be abbreviated as an FDD hereinafter). The HDD 108 and FDD 109 are used as storage areas of an OS, application programs such as a browser and the like, data, libraries, and the like. Also, a storage device that uses removable media such as an MO, flash memory, and the like may be arranged in place of or in addition to the FDD. Note that a given area of the HDD 108 may be used as the storage section 22.

Reference numeral 110 denotes a CD/DVD-ROM/R/RW drive, which reads/writes data from/to CD/DVD-ROM/R/RW media. In addition, an external storage device such as a magnetic tape drive (e.g., a tape streamer, DDS, or the like) and the like may be arranged.

Reference numeral 111 denotes a network interface used to connect the computer apparatus to a computer network such as Ethernet or the like. Reference numeral 112 denotes a bus (including an address bus, data bus, and control bus) that interconnects the aforementioned units. The computer apparatus also has a serial interface such as RS-232C, RS-422, USB (Universal Serial Bus), IEEE1394, and the like, and a parallel interface such as IEEE1284 and the like in addition to the network interface 111, so as to allow connections to external devices such as a modem, printer, and the like.

The image input section 21 may be implemented as a video input device connected to such serial or parallel interface, or as an expansion card like a video input card connected to the bus 112.

Such versatile computer apparatus communicates with another device on the computer network or a public telephone network using a router (including a dial-up router) connected via the network interface 111, and a modem, TA, or the like connected via the serial interface, using an OS, required driver software, and the like.

Figure 3:
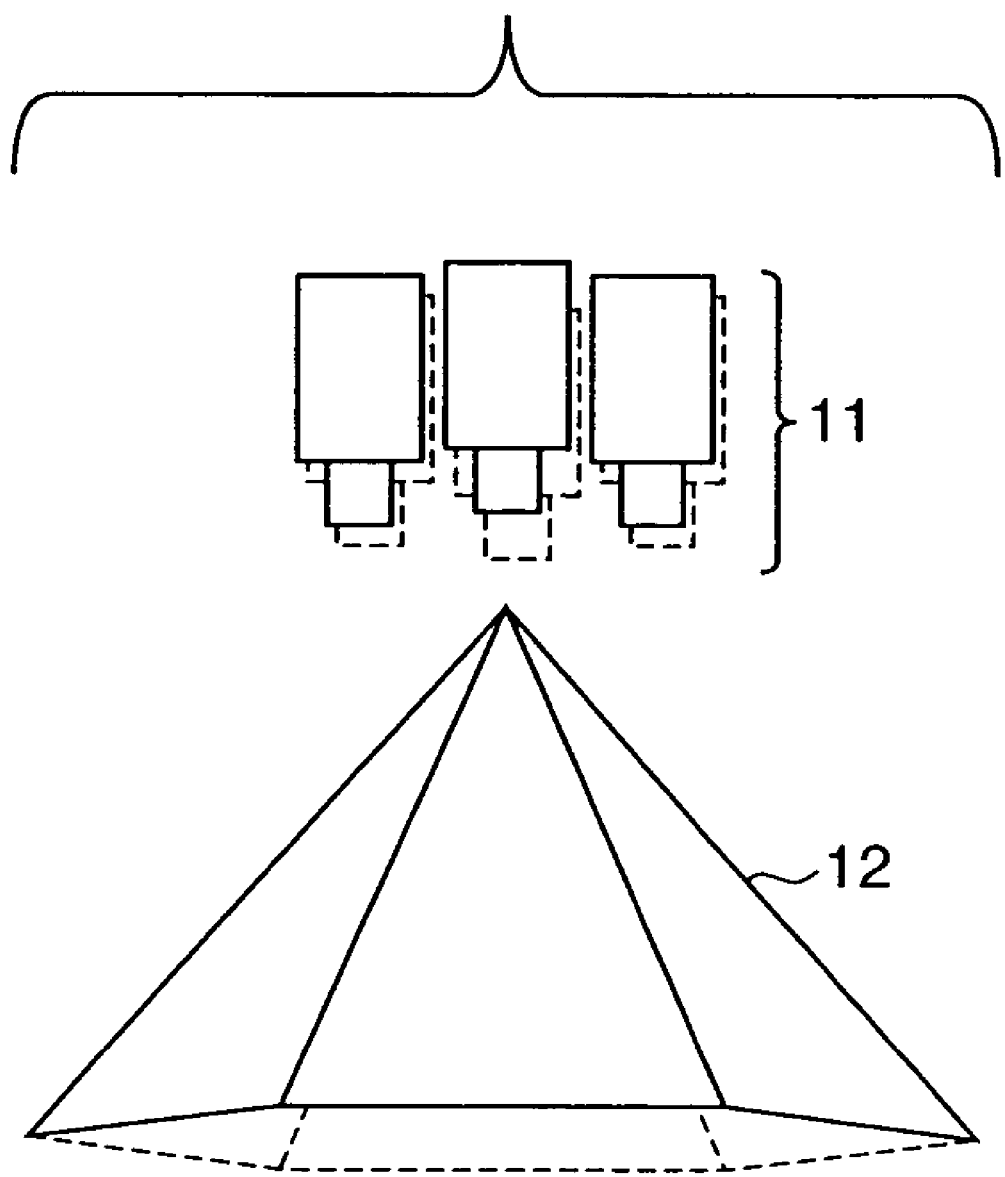
FIG. 3 is a view showing an example of the arrangement of an image sensing unit which senses a broad visual field image using a pyramid mirror.

In this embodiment, as the basic arrangement of the image sensing unit 10, arbitrary arrangements such as an arrangement that uses a pyramid mirror shown in FIG. 3, an arrangement in which a plurality of cameras are laid out in a radial pattern, and the like can be adopted as long as they can sense a predetermined continuous visual field using a plurality of cameras whose visual fields to be sensed partially overlap each other.

This embodiment will exemplify a case wherein two cameras are used to sense panorama source images, and one camera is used to sense a hue or brightness reference image. The following explanation will be given using an arrangement in which cameras are arranged in a radial pattern in place of the arrangement using the pyramid mirror shown in FIG. 3 so as to help understand the principle. For example, when the reference image sensing camera is laid out to directly sense an image of an object in place of sensing a reflected image of a mirror, a process common to that used when cameras are arranged in the radial pattern can be used.

Figure 4:
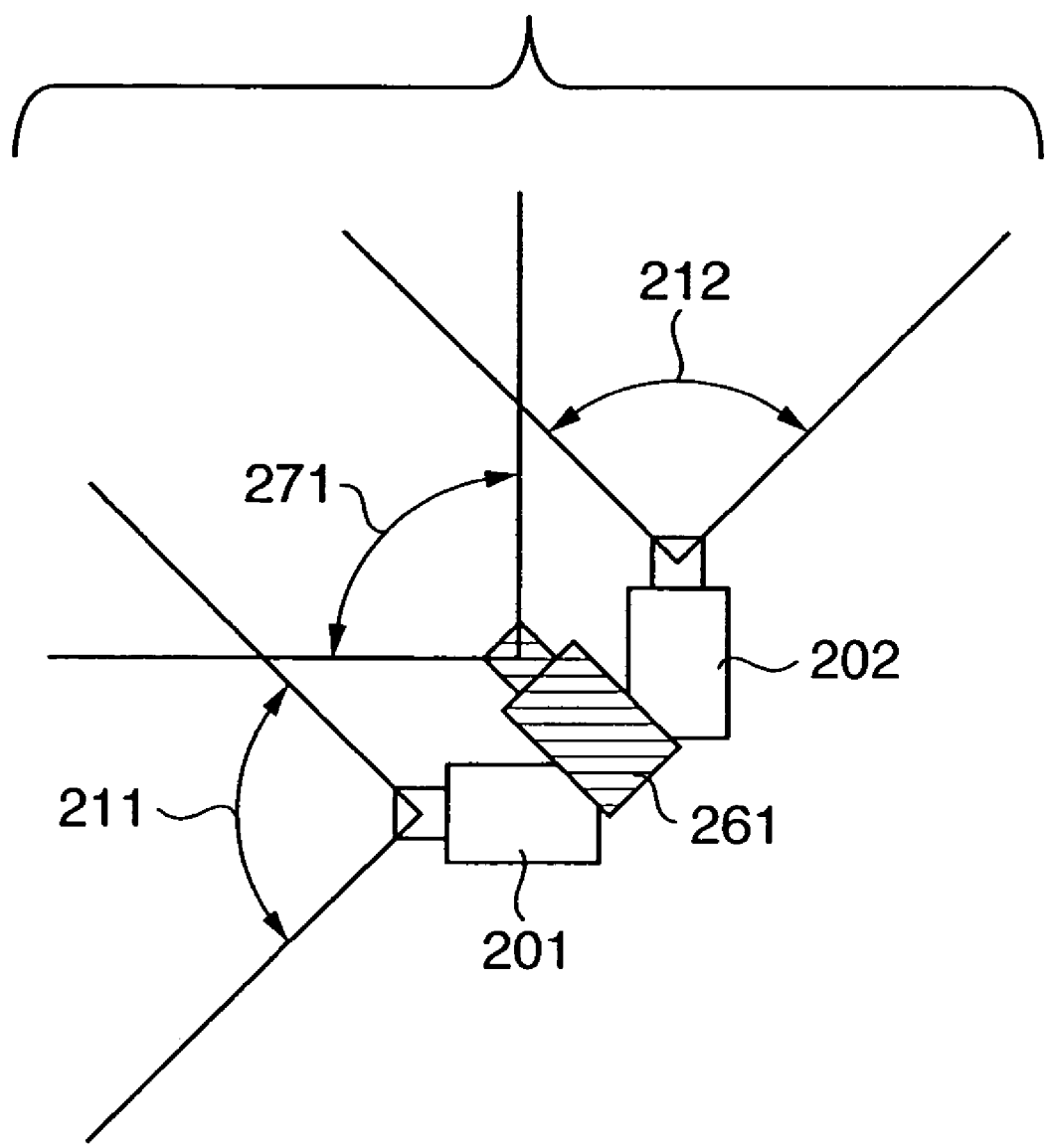
FIG. 4 shows an example of the camera layout of an image sensing unit according to the first embodiment of the present invention.

FIG. 4 is a top view of the layout of the cameras 11 of the image sensing unit 10 in the image processing system of this embodiment. Reference numerals 201 and 202 denote cameras, which are used to sense a panoramic image, and respectively have visual fields 211 and 212. Reference numeral 261 denotes a hue or brightness reference camera which has a visual field 271. The visual fields 211 and 212 have nearly no overlapping portion. By contrast, the visual field 271 has overlapping portions with the visual fields 211 and 212, respectively.

Figure 5:
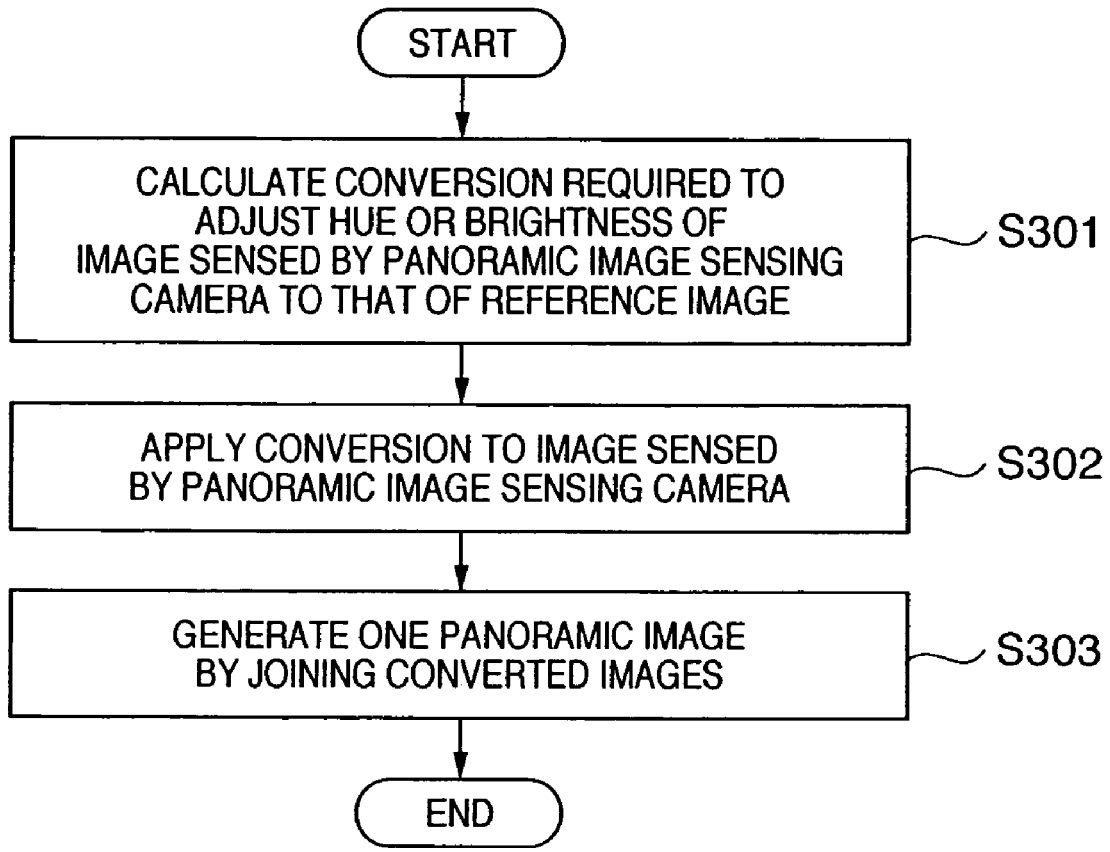
FIG. 5 is a flow chart for explaining a panoramic image generation process according to the first embodiment of the present invention.

A process for generating a panoramic image from images sensed by the image sensing unit 10 with the aforementioned camera layout will be described below using the flow chart shown in FIG. 5. Note that this process is implemented when the aforementioned computer apparatus serving as the control section 23 executes a program stored in the HDD 108 and the like. Also, the process shown in FIG. 5 is executed for still images or moving image frames sensed by the respective cameras at an identical time.

Figure 6:
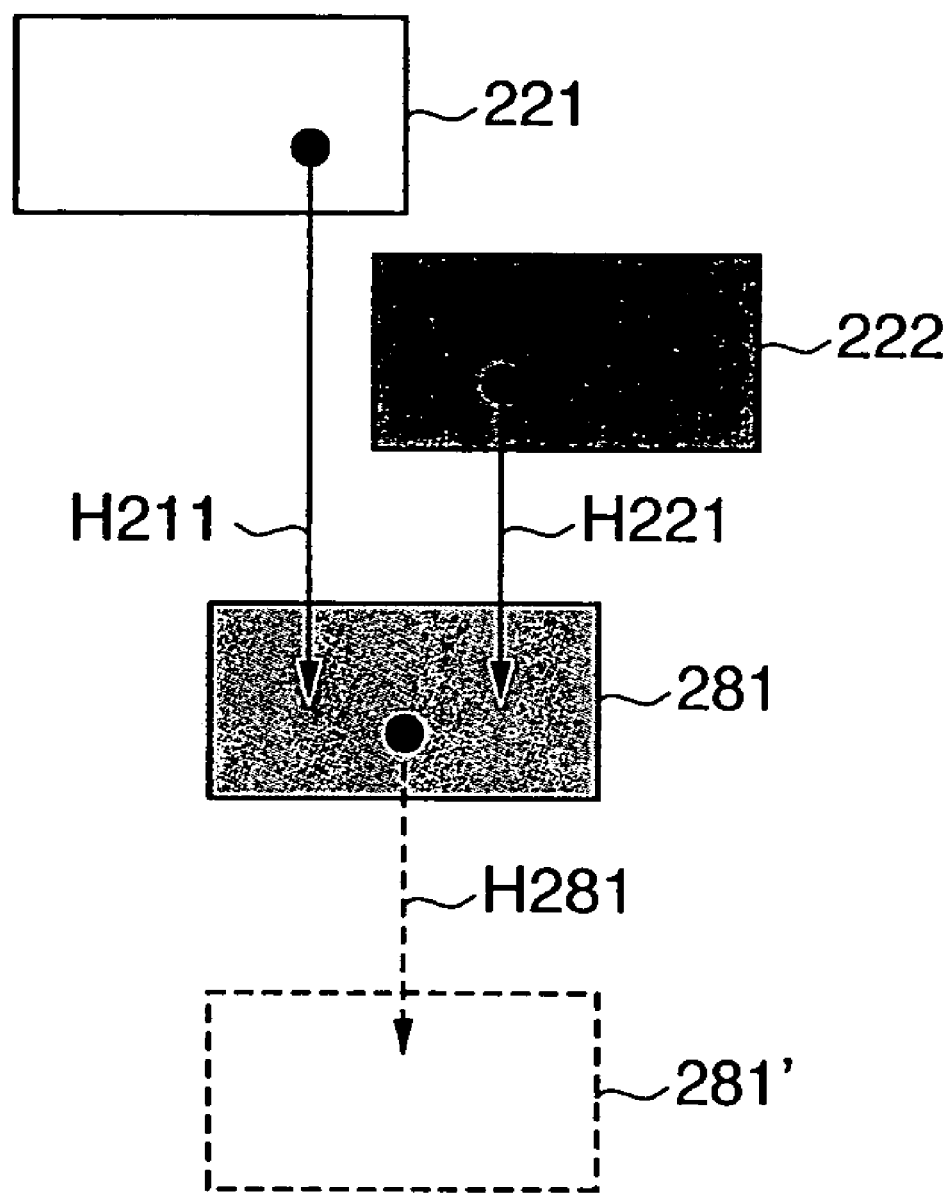
FIG. 6 is a view for explaining a conversion process in the first embodiment of the present invention.

In step S301, a conversion H211 required to adjust the hue or brightness of an image 221 sensed by the camera 201 to that of an image 281 sensed by the camera 261, and a conversion H221 required to adjust the hue or brightness of an image 222 sensed by the camera 202 to that of the image 281 sensed by the camera 261, as shown in FIG. 6, are calculated.

The conversion H211 can be calculated in, e.g., the following sequence. Edges (contours) are extracted from the images 221 and 281. Some corresponding regions of the images 221 and 281 where identical objects appear are obtained on the basis of the edge extraction results. Then, mathematical formulas or matrices, each of which is used to convert the hue or brightness of the image 221 into that of the image 281, are obtained on the basis of the differences between color components or luminance values of corresponding pixels in the respective corresponding regions, and one conversion is determined using, e.g., the method of least squares. The conversion H221 can be calculated in a similar sequence.

Note that the conversions H211 and H221 are not limited to mathematical formulas or matrices, and may be expressed by correspondence tables or the like.

Also, a conversion H281 used to convert the hue or brightness of the image 281 into a predetermined hue or brightness (281') may be calculated.

Figure 7:
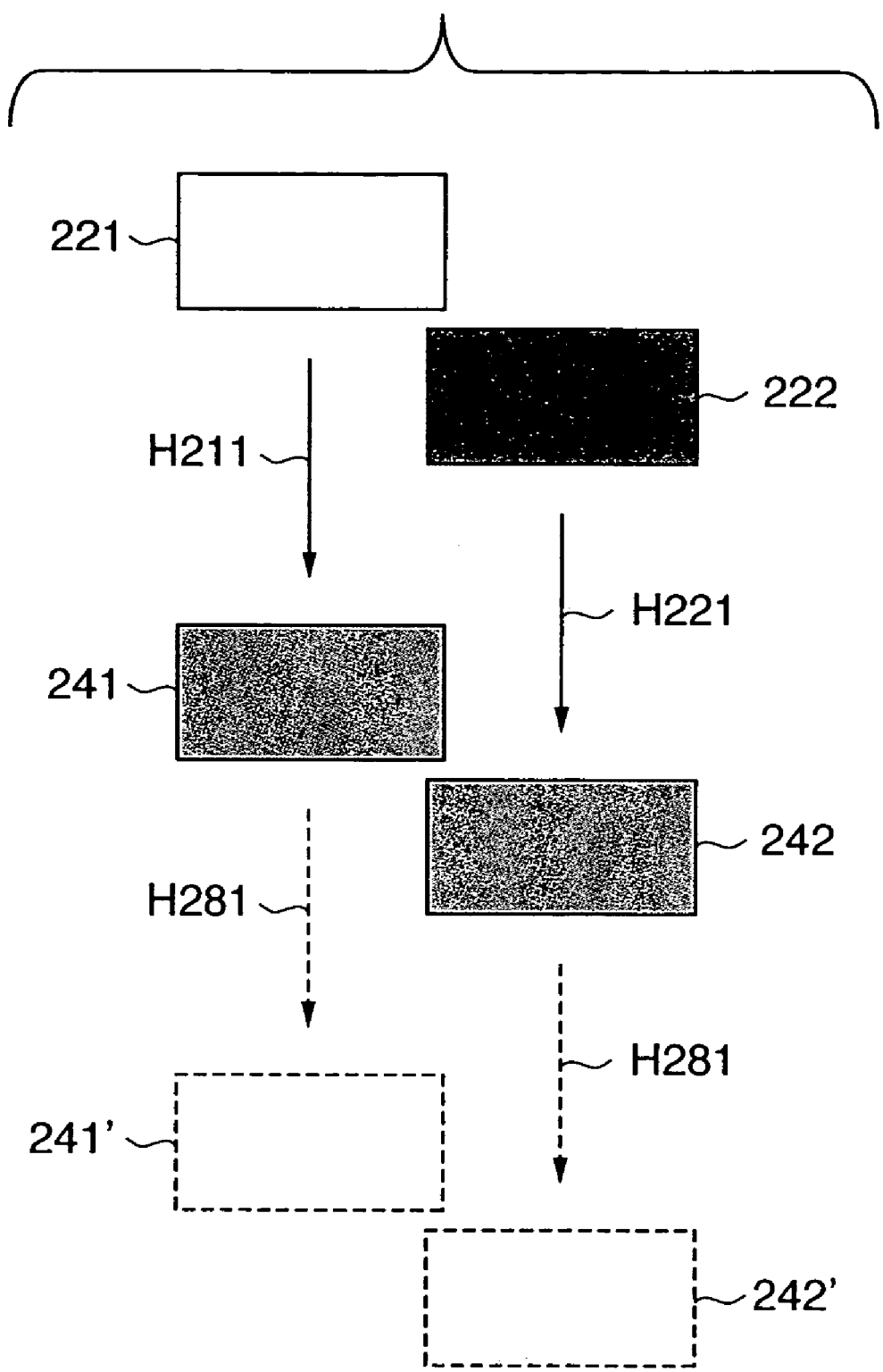
FIG. 7 is a view for explaining a conversion process in the first embodiment of the present invention.

In step S302, the conversion H211 is applied to the image 221 to generate an image 241, and the conversion H221 is applied to the image 222 to generate an image 242, as shown in FIG. 7.

Note that the conversion H281 may be further applied to the images 241 and 242. Alternatively, a conversion obtained by combining the conversions H211 and H281 may be applied to the image 221, and a conversion obtained by combining the conversions H221 and H281 may be applied to the image 222.

Figure 8:
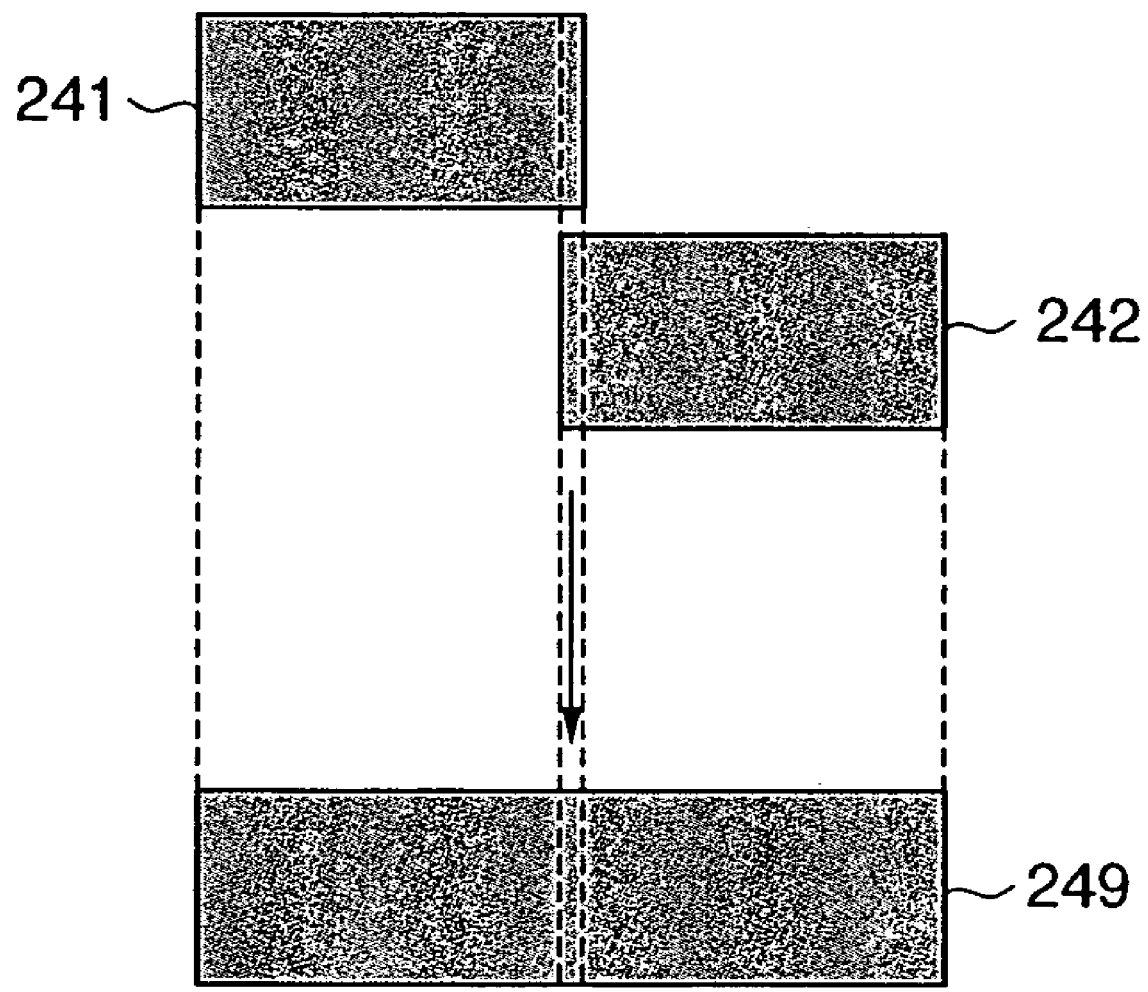
FIG. 8 is a view for explaining a composition process in the first embodiment of the present invention.

Finally, in step S303 the images 241 and 242 are joined to generate one panoramic image 249, as shown in FIG. 8.

Note that steps S302 and S303 may be executed at the same time. That is, the conversions H211 and H221 for the images 221 and 222, and the join process of images may be executed at the same time.

With the above processes, since the hue or brightness of each of the images 221 and 222 is converted to that of the image 281, the hue or brightness discontinuities at the seam of the images 221 and 222 can be reduced.

Modification 1 of First Embodiment

As a modification of the first embodiment, the arrangement of an image sensing unit used to generate a full-view panoramic image, and a method of generating the full-view panoramic image will be described below.

Figure 9:
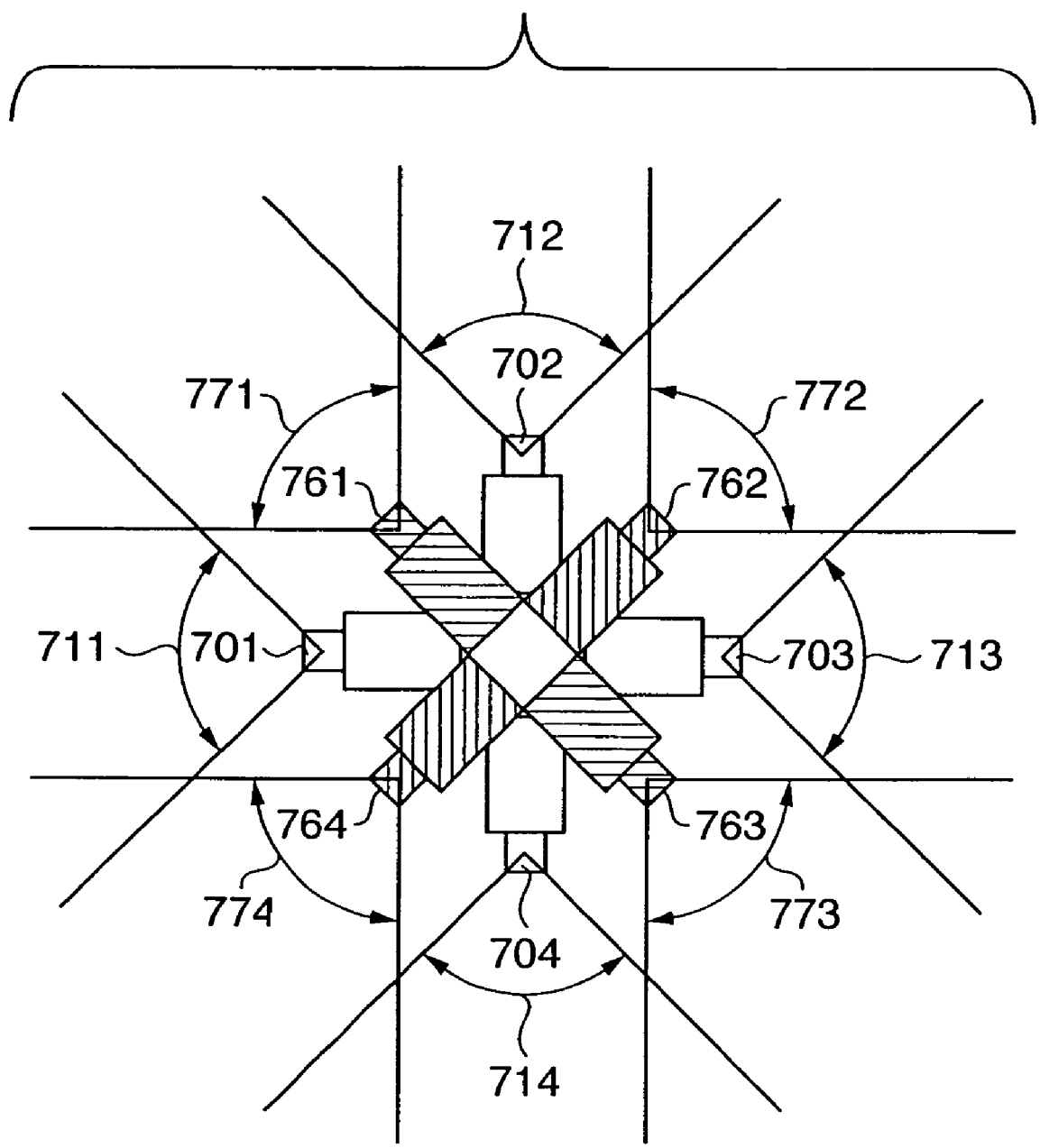
FIG. 9 shows an example of the camera layout of the image sensing unit according to modification 1 of the first embodiment of the present invention.

In this modification, four cameras used to sense a panoramic image, and four hue or brightness reference cameras are used so as to capture a full-view visual scene within a visual field. FIG. 9 shows an example of such arrangement by the same method as in FIG. 4. The arrangement of the image sensing unit shown in FIG. 9 is basically obtained by expanding that shown in FIG. 4. In the arrangement shown in FIG. 4, the two cameras (201, 202) used to sense a panoramic image, and one hue or brightness reference camera (261) are used. In the arrangement shown in FIG. 9, two cameras used to sense a panoramic image, and three hue or brightness reference cameras are further added to that shown in FIG. 4.

Referring to FIG. 9, reference numerals 701 to 704 denote cameras which are used to sense a panoramic image and respectively have visual fields 711 to 714. Reference numerals 761 to 764 denote hue or brightness reference cameras which respectively have visual fields 771 to 774. Note that the visual fields 711 and 714 can cover the full-view range in combination, but neighboring visual fields have nearly no overlapping portions. By contrast, the visual field 771 has overlapping portions with the visual fields 711 and 712, respectively, the visual field 772 has overlapping portions with the visual fields 712 and 713, respectively, the visual field 773 has overlapping portions with the visual fields 713 and 714, respectively, and the visual field 774 has overlapping portions with the visual fields 714 and 711, respectively.

Upon making photographing operations in a still state, a single camera may be arranged at the positions of the cameras 761 to 764 shown in FIG. 9 in turn to sense hue or brightness reference images in place of arranging the four hue or brightness reference cameras 761 to 764.

The basic sequence for generating a full-view panoramic image using images sensed by the image sensing unit with the above arrangement is the same as that described using the flow chart of FIG. 5. However, in case of the full-view panoramic image, since a plurality of reference images must be taken into consideration upon composition, the conversion contents are slightly different. A conversion process of an image 722 sensed by the camera 702 will be explained below. Also, after images 721, 723, and 724 sensed by the cameras 701, 703, and 704 undergo similar processes, the neighboring images are composited to obtain a full-view panoramic images.

More specifically, as shown in FIG. 10, let H721 be a conversion required to adjust the hue or brightness of the image 722 to that of a first reference image 781 sensed by the left neighboring reference camera 761, and H722 be a conversion required to adjust the hue or brightness of the image 722 to that of a second reference image 782 sensed by the right neighboring reference camera 762.

In order to obscure the seams upon composition, it is desirable to convert the color of the image 722 so that the hue or brightness of a portion which is closer to the seam with an image 721 as a left neighboring source image of the panoramic image becomes closer to that of the first reference image 781, and the hue or brightness of a portion which is closer to the seam with an image 723 as a right neighboring source image of the panoramic image becomes closer to that of the second reference image 782. For this purpose, as shown in FIG. 11, the image 722 undergoes a conversion weighted based on H721 and H722 according to the distances from the two ends of the image to generate an image 742. Let H72 be this conversion. Then, the conversion H72 is described by:

$H72 = \alpha \times H721 + (1-\alpha) \times H722$ where $\alpha$ is a value indicating the distance from the left end when the left end of the image is $\alpha=0$ and its right end is $\alpha=1$ ($0 \leq \alpha \leq 1$).

Figure 12:
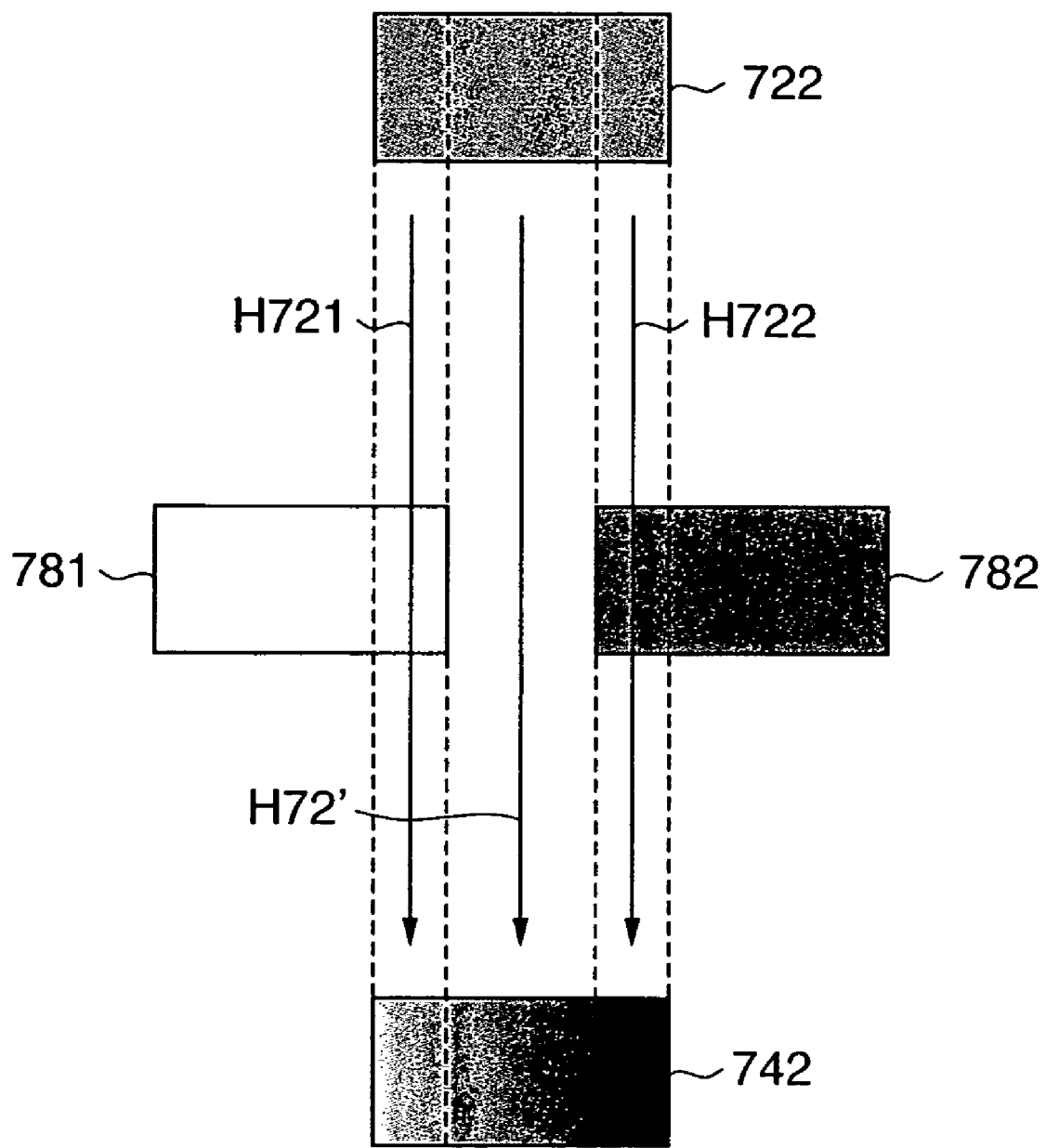
FIG. 12 is a view for explaining another conversion process in modification 1 of the first embodiment of the present invention.

Another conversion application method may be used. For example, as shown in FIG. 12, the conversion H721 is applied to the overlapping portion between the images 722 and 781, the conversion H722 is applied to the overlapping portion between the images 722 and 782, and a conversion weighted based on H721 and H722 according to the distances from the two ends of a non-overlapping portion of the image 722, which overlaps neither the image 781 nor the image 782, is applied to that non-overlapping portion. The conversion formula for the non-overlapping portion is described by, e.g., the same formula as above. In this case, the value α is used when the position of α=0 is the left end of the non-overlapping portion and that of α=1 is the right end of the non-overlapping portion.

When the aforementioned process is applied to the images 721, 723, and 724 respectively sensed by the cameras 701, 703, and 704, the hue or brightness discontinuities at the seams upon generating a full-view panoramic image by compositing the images 721 to 724 can be reduced, and a natural full-view panoramic image can be obtained.

Modification 2 of First Embodiment

Modification 1 described above uses the image sensing unit which has the four reference image sensing cameras and is used to generate a full-view panoramic image. However, in this modification, a single camera with a fisheye lens (field angle=180°) is used as the reference image sensing camera. In this case, the reference image sensing camera is set with its lens facing up.

Figure 13:
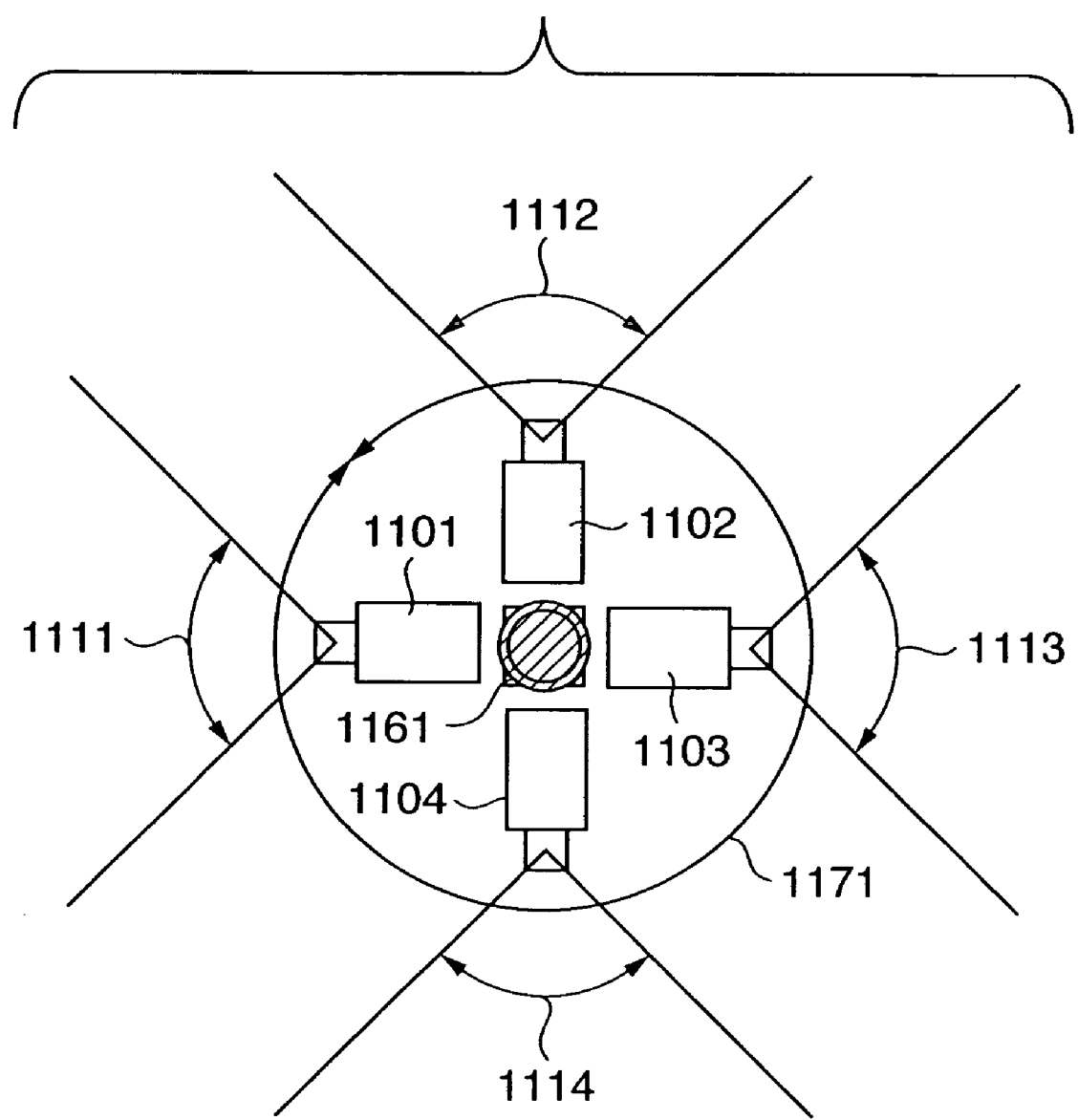
FIG. 13 shows an example of the camera layout of the image sensing unit according to modification 2 of the first embodiment of the present invention.

More specifically, as shown in FIG. 13, cameras 1101 to 1104 used to sense source images of a panoramic images have the same arrangement and layout as those of the cameras 701 to 704 in FIG. 9, but only one reference image sensing camera 1161 is arranged.

Note that the reference image sensing camera 1161 can adopt an arbitrary arrangement that allows a single camera to capture a full-view visual within its visual field (e.g., a combination of a hyperboloidal mirror and normal lens) in place of the fisheye lens.

In FIG. 13, the cameras 1101 to 1104 are used to sense a panoramic image, and respectively have visual fields 1111 to 1114. Also, the reference image sensing camera 1161 has a full-view visual field 1171. Assume that the visual fields 1111 to 1114 have nearly no overlapping portions. By contrast, the visual field 1171 has overlapping portions with the visual fields 1111 to 1114, respectively.

The sequence for generating a full-view panoramic image using images sensed by the image sensing unit with the above arrangement is substantially the same as that in modification 1 above. However, this modification is different from modification 1 in that the reference image has a full-view range, and the sensed reference image has unique distortions due to the effect of the fisheye lens and the like. For this reason, a process for extracting portions used in the conversions of panorama source images from the reference image including the full-view visual scene, and a process for converting the extracted portions into images sensed by a normal lens are required.

This extraction process can be implemented by extracting portions corresponding to the visual fields of the reference image sensing cameras 761 to 764 in, e.g., FIG. 9 from the reference image. That is, since the relative positions of the cameras which form the image sensing unit are fixed, the correspondence between portions of the sensed reference image and the visual fields of the cameras 761 to 764 in FIG. 9 may be examined in advance, and these regions may be extracted.

A process for providing the conversion effect of the field angle of a lens by an image process is known to those who are skilled in the art. Hence, by applying a conversion process to the field angle corresponding to the visual fields of the cameras 761 to 764 to the images of the extracted regions, the reference images 781, 782, and the like shown in FIG. 10 can be obtained. Of course, panorama source images (1111 to 1114) sensed by the cameras 1101 to 1104 may be converted to a state equivalent to a reference image 1181 sensed by the camera 1161, and a required conversion may be generated.

As a result, a process for adjusting the hue or brightness of each of images 1121, 1122, 1123, and 1124 respectively sensed by the cameras 1101, 1102, 1103, and 1104 to that of the image 1181 sensed by the camera 1161 is executed.

By compositing the converted images (1111 to 1114), a full-view panoramic image in which the hue or brightness discontinuities at the seams are reduced can be generated.

As described above, according to this embodiment, upon compositing two images having an overlapping portion, these images are composited after they are converted in correspondence with a reference image which has overlapping portions with both the two images. Therefore, even when images which have nearly no overlapping portions are to be composited, a panoramic image in which the hue or brightness discontinuities are reduced, and which has an inconspicuous seam can be generated.

Note that this embodiment has explained only the case wherein the image sensing unit that senses a full-view visual scene by the four cameras is used. However, an arbitrary number of panorama source image sensing cameras can be used in the image sensing-unit as long as two or more cameras are arranged. Also, each camera used in this embodiment may be either a camera that senses a moving image or a camera that senses a still image. When panoramic images are to be successively generated using moving image sensing cameras, the process according to this embodiment need not always be applied to each image frame. For example, the process of this embodiment need only be executed when the hue or brightness of an image has largely deviated from a threshold value due to changes in illumination condition and the like.

Second Embodiment

The first embodiment generates a panoramic image in which the hue or brightness discontinuities are reduced using a reference image which is sensed by a camera arranged in addition to the panorama source image sensing cameras, and has overlapping portions with two source images to be composited. By contrast, this embodiment is characterized in that the same effect as in the first embodiment is realized using an image sensed by moving a plurality of cameras used to sense a panoramic image without using any reference image sensing camera. That is, this embodiment is characterized in that a reference image is an image which is sensed at a time different from one of source images, and another source image to be composited with that source image.

Since the arrangement of the image processing system according to this embodiment is common to that shown in FIG. 1, a description thereof will be omitted.

Figure 14:
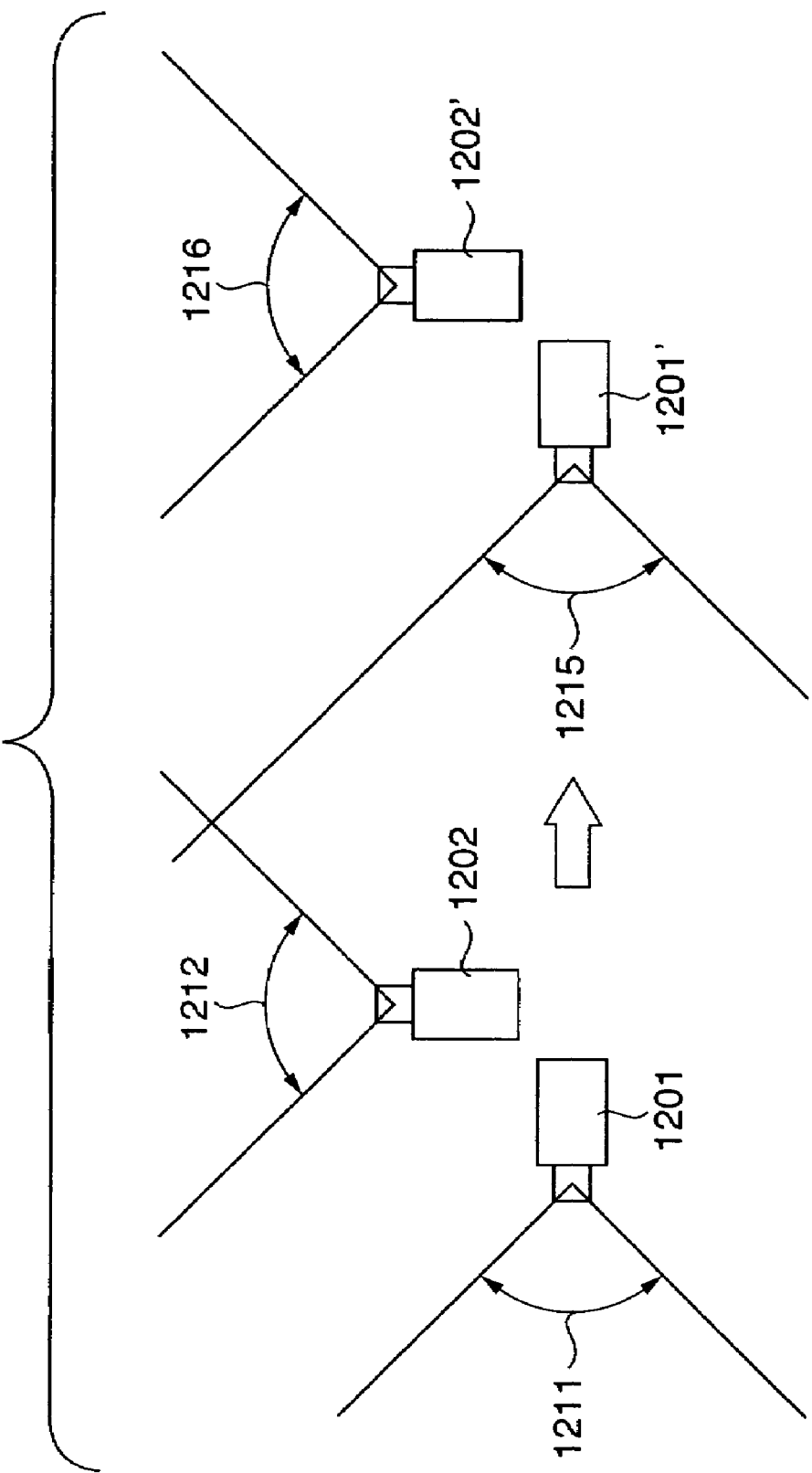
FIG. 14 is a view for explaining an example of the camera layout of an image sensing unit and the principle of a composition process according to the second embodiment of the present invention.

FIG. 14 shows an example of the camera layout in the image sensing unit 10 of the image processing system according to this embodiment. Assume that a panoramic image is generated by compositing images sensed by two cameras.

Referring to FIG. 14, reference numerals 1201 and 1202 denote cameras which are used to sense panorama source images, and respectively have visual fields 1211 and 1212. Note that the visual fields 1211 and 1212 have nearly no overlapping portion. If these cameras are set on a moving member that moves in the direction of the arrow in FIG. 14, the cameras 1201 and 1202 move to positions 1201' and 1202' after an elapse of a predetermined period of time. A visual field 1215 of the camera 1201' after movement has an overlapping portion with the visual field 1212 of the camera 1202 before movement.

A process for reducing the hue or brightness discontinuities on the basis of the layout of the respective cameras will be described below using the flow chart of that process shown in FIG. 15.

Figure 16:
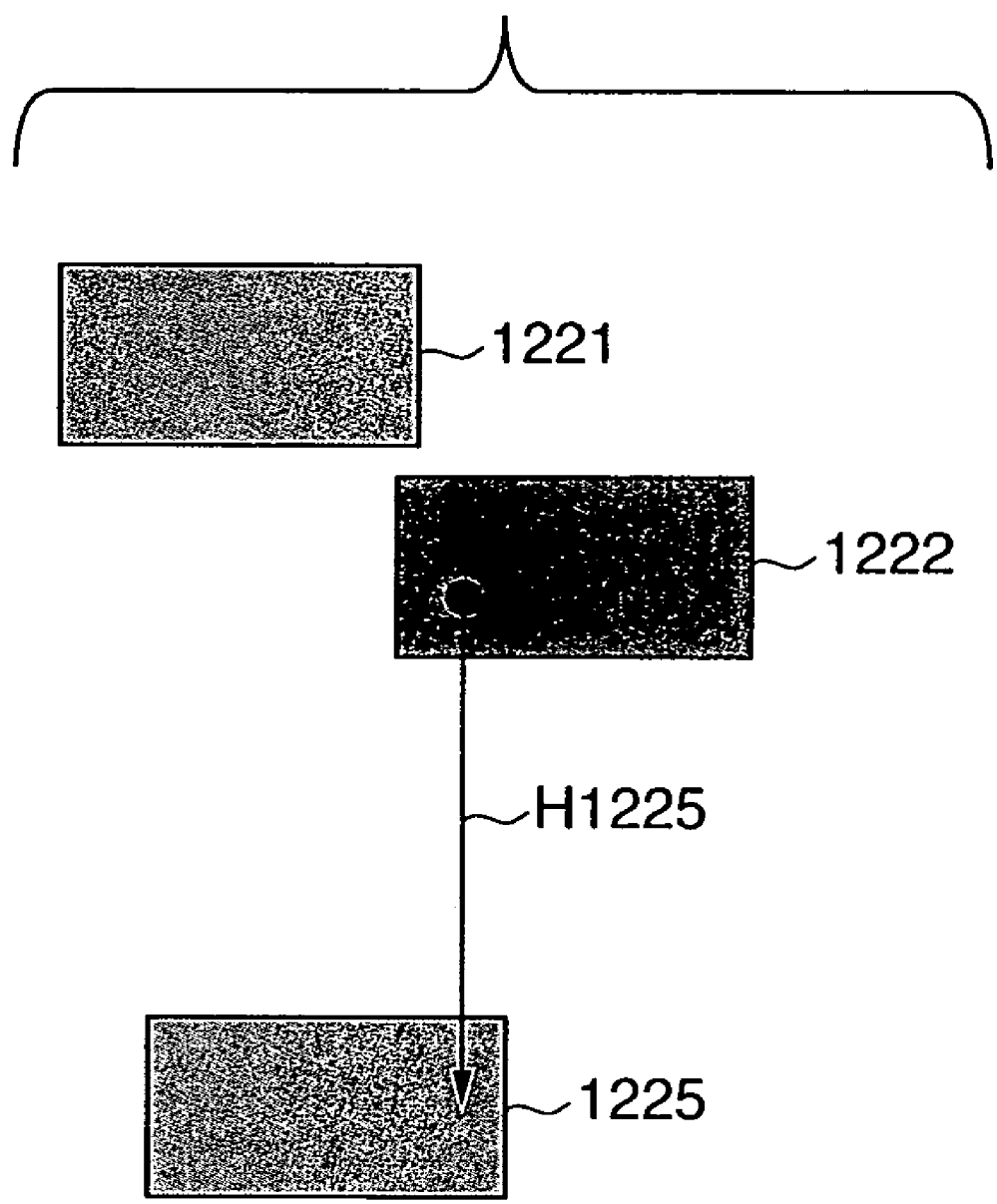
FIG. 16 is a view for explaining a conversion process in the second embodiment of the present invention.

In step S1301, a conversion H1225 required to adjust the hue or brightness of an image 1222 sensed by the camera 1202 to that of an image 1225 sensed by the camera 1201' after movement, as shown in FIG. 16, is calculated.

If the hue or brightness of an image has nearly no change during movement of the cameras, i.e., images 1221 and 1225 sensed by the camera 1201 have nearly equal hue or brightness, the conversion H1225 becomes substantially the same as a conversion H1221 between the hue or brightness of the image 1222 and that of the image 1221.

The conversion H1225 can be calculated in, e.g., the following sequence. Edges are extracted from the images 1222 and 1225. Some corresponding regions of the images 1222 and 1225 where identical objects appear are obtained on the basis of the edge extraction results. Then, mathematical formulas or matrices, each of which is used to convert the hue or brightness of the image 221 into that of the image 281, are obtained on the basis of the differences between color components or luminance values of corresponding pixels in the respective corresponding regions, and one conversion is determined using, e.g., the method of least squares.

Note that the conversion H1225 is not limited to a mathematical formula or matrix, and may be expressed by a correspondence table or the like.

Figure 17:
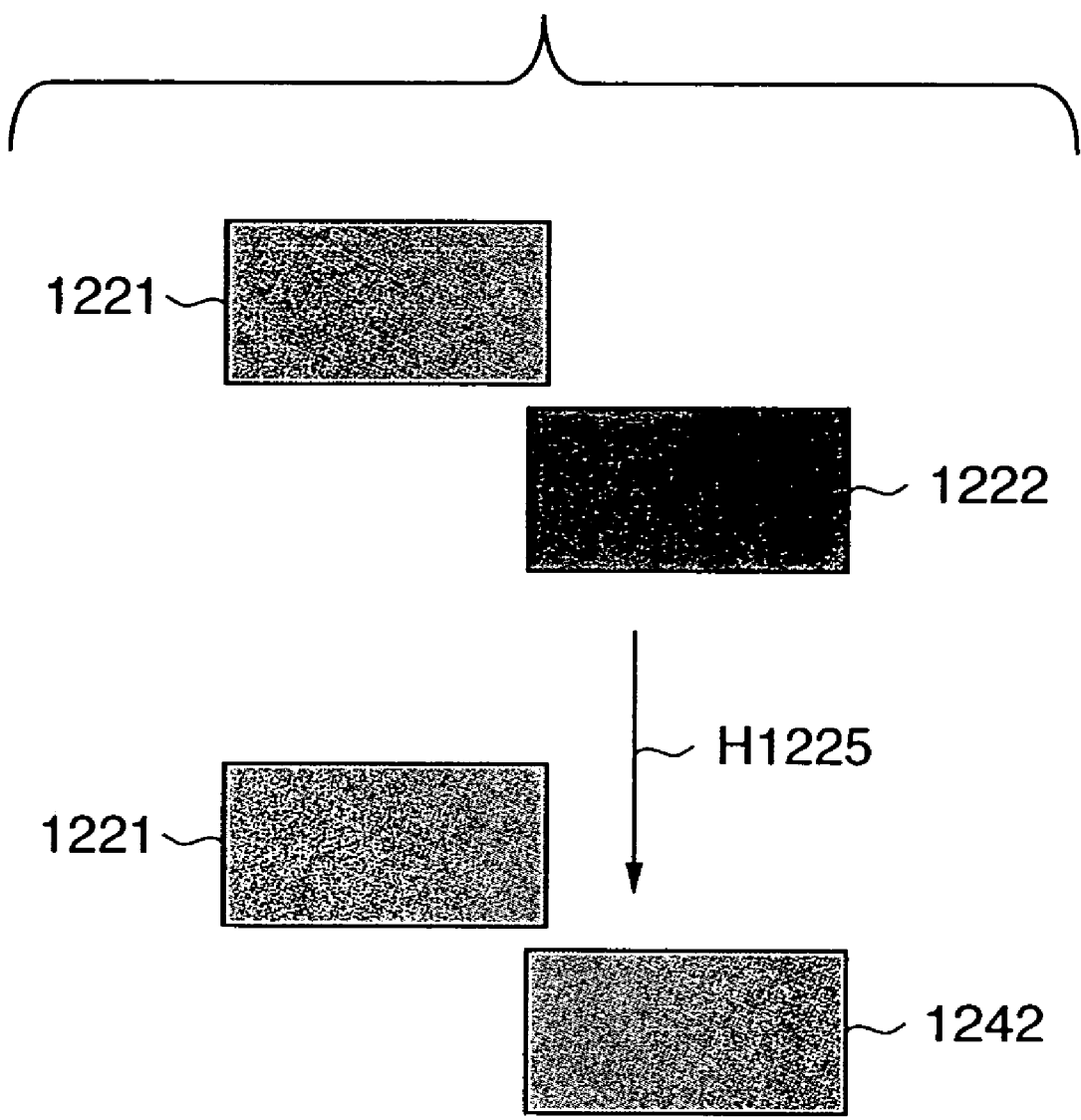
FIG. 17 is a view for explaining a conversion process in the second embodiment of the present invention.

In step S1302, the conversion H1225 is applied to the image 1222 to generate an image 1242, as shown in FIG. 17.

Figure 18:
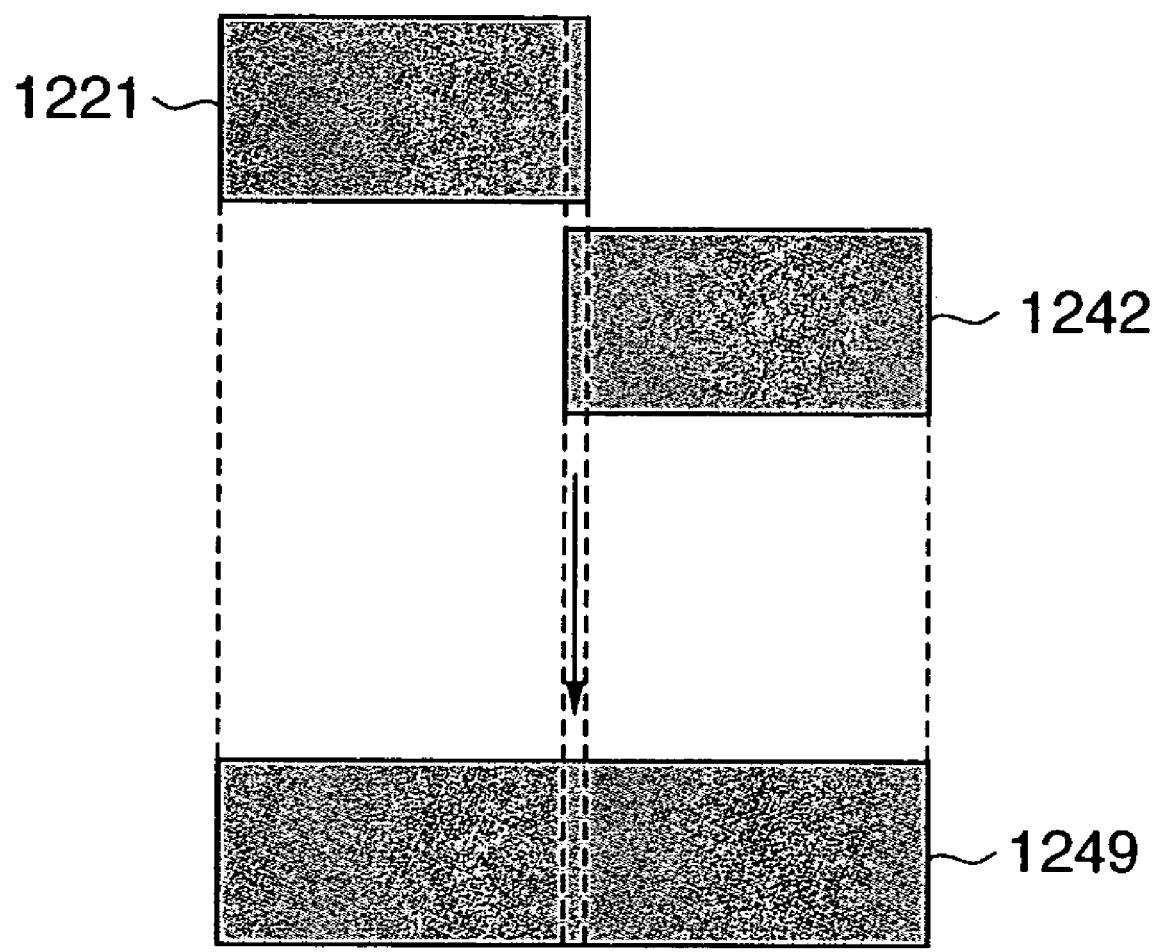
FIG. 18 is a view for explaining a composition process in the second embodiment of the present invention.

Finally, in step S1303 the images 1221 and 1242 are joined to generate one panoramic image 1249, as shown in FIG. 18.

Note that steps S1302 and S1303 may be executed at the same time. That is, the conversion H1225 for the image 1222 and the joining process of the images may be executed at the same time.

In this way, since images are composited after the hue or brightness of the image 1222 is converted to that of the image 1225, which is substantially the same as the hue or brightness of the image 1221, a panoramic image in which the hue or brightness discontinuities at the seam of the images 1221 and 1222 are reduced can be generated.

Modification 1 of Second Embodiment

As a modification of the second embodiment, the arrangement of an image sensing unit used to generate a full-view panoramic image, and a method of generating the full-view panoramic image will be described below.

Figure 19:
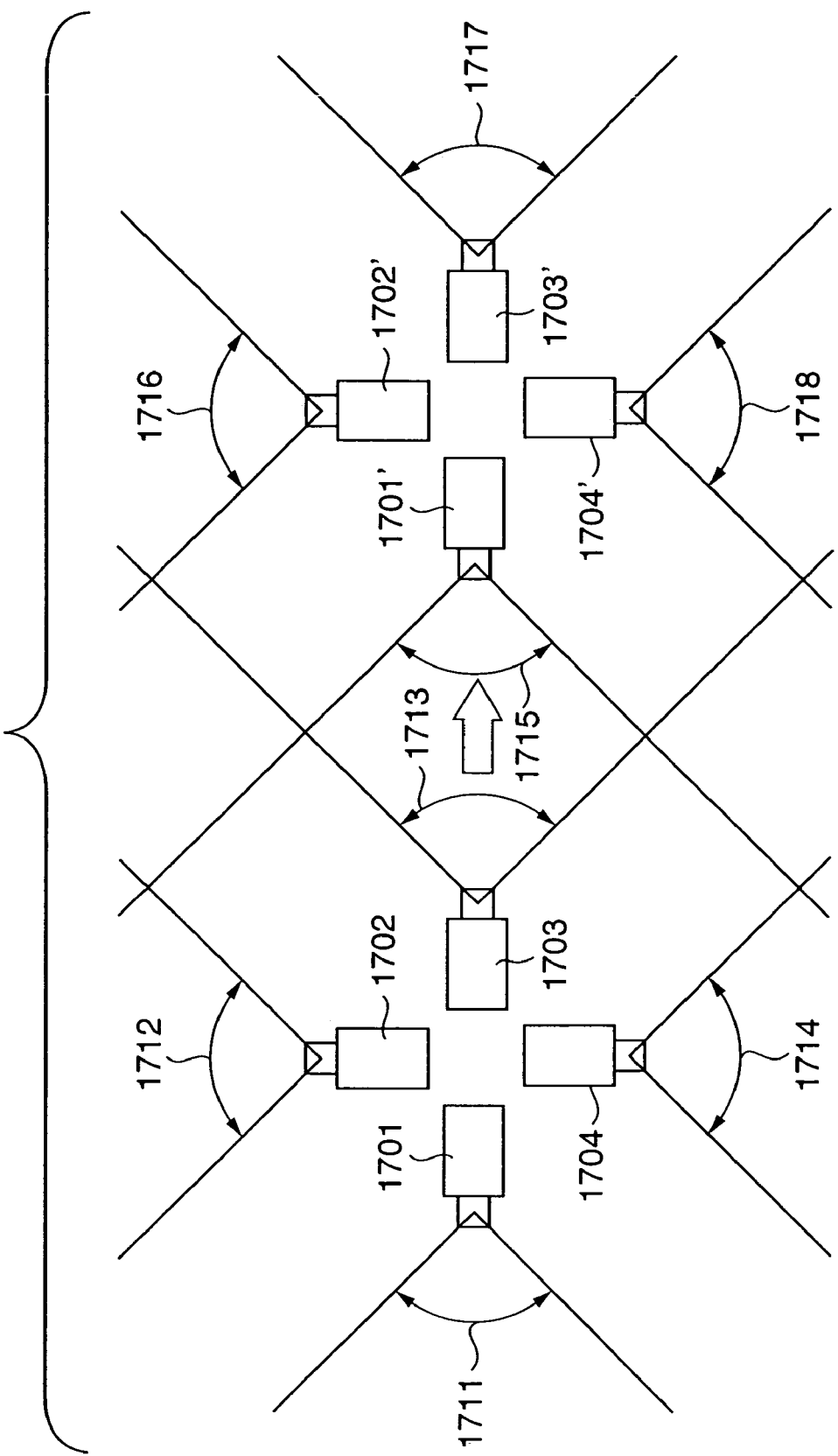
FIG. 19 is a view for explaining an example of the camera layout of the image sensing unit and the principle of a composition process according to modification 1 of the second embodiment of the present invention.

In this modification, four cameras are used to sense a panoramic image, so as to capture a full-view visual scene within a visual field. FIG. 19 shows an example of the camera layout. The arrangement of the cameras shown in FIG. 19 is basically obtained by expanding that shown in FIG. 14. In the arrangement shown in FIG. 14, the two cameras (1201, 1202) are used to sense a panoramic image.

In the arrangement shown in FIG. 19, two cameras are further added to the arrangement shown in FIG. 14 so as to sense a panoramic image.

Referring to FIG. 19, reference numerals 1701 to 1704 denote cameras which are used to sense panorama source images and respectively have visual fields 1711 to 1714. Note that even neighboring ones of the visual fields 1711 and 1714 have nearly no overlapping portions.

When the cameras have moved a predetermined distance in the direction of the arrow in FIG. 19, respective cameras 1701' to 1704' after movement respectively have visual fields 1715 to 1718. As a result, the visual field 1715 of the camera 1701 after movement has overlapping portions with the visual fields 1712 and 1714 of the cameras 1702 and 1704 before movement, and the visual field 1713 of the camera 1703 before movement has overlapping portions with the visual fields 1716 and 1718 of the cameras 1702 and 1704 after movement.

Figure 15:
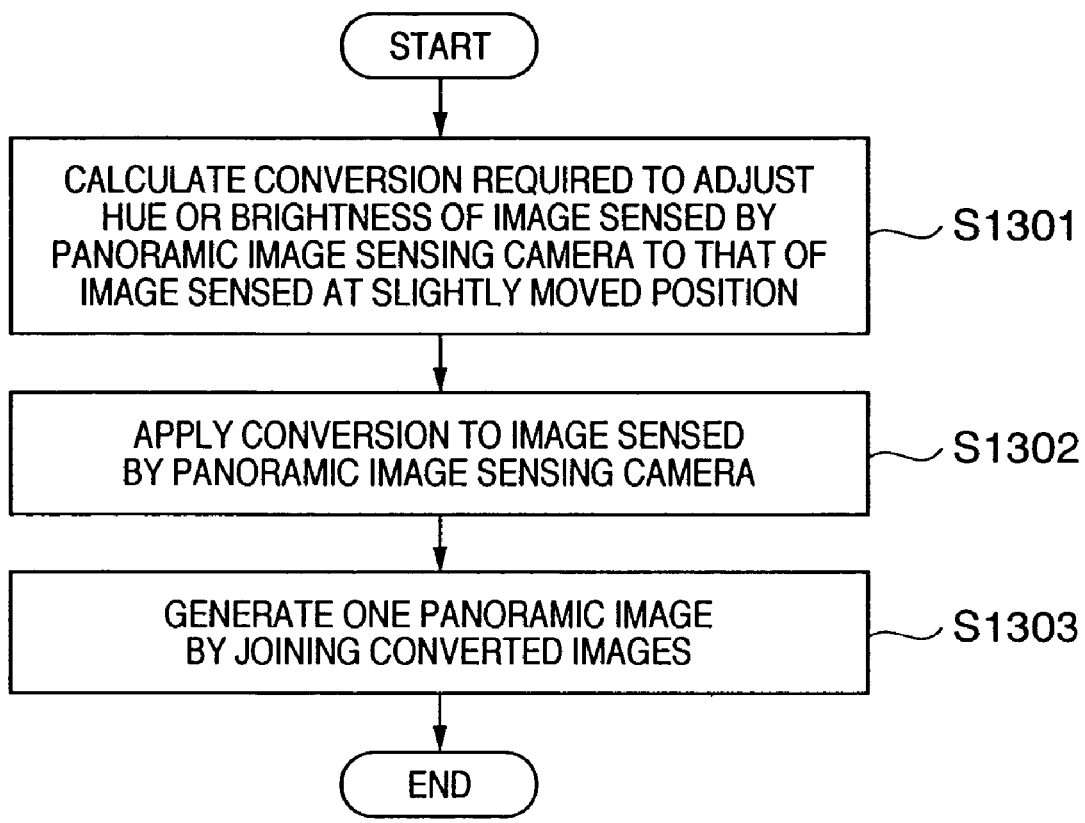
FIG. 15 is a flow chart for explaining a panoramic image generation process according to the second embodiment of the present invention.

The basic sequence for generating a full-view panoramic image using images sensed by the image sensing unit with the above arrangement is the same as that described using the flow chart of FIG. 15. However, since a full-view panoramic image is to be generated, the conversion contents are slightly different. A conversion process of an image 1722 sensed by the camera 1702 will be explained below. Also, after images 1721, 1723, and 1724 sensed by the cameras 1701, 1703, and 1704 undergo similar processes, the neighboring images are composited to obtain a full-view panoramic images.

Figure 20:
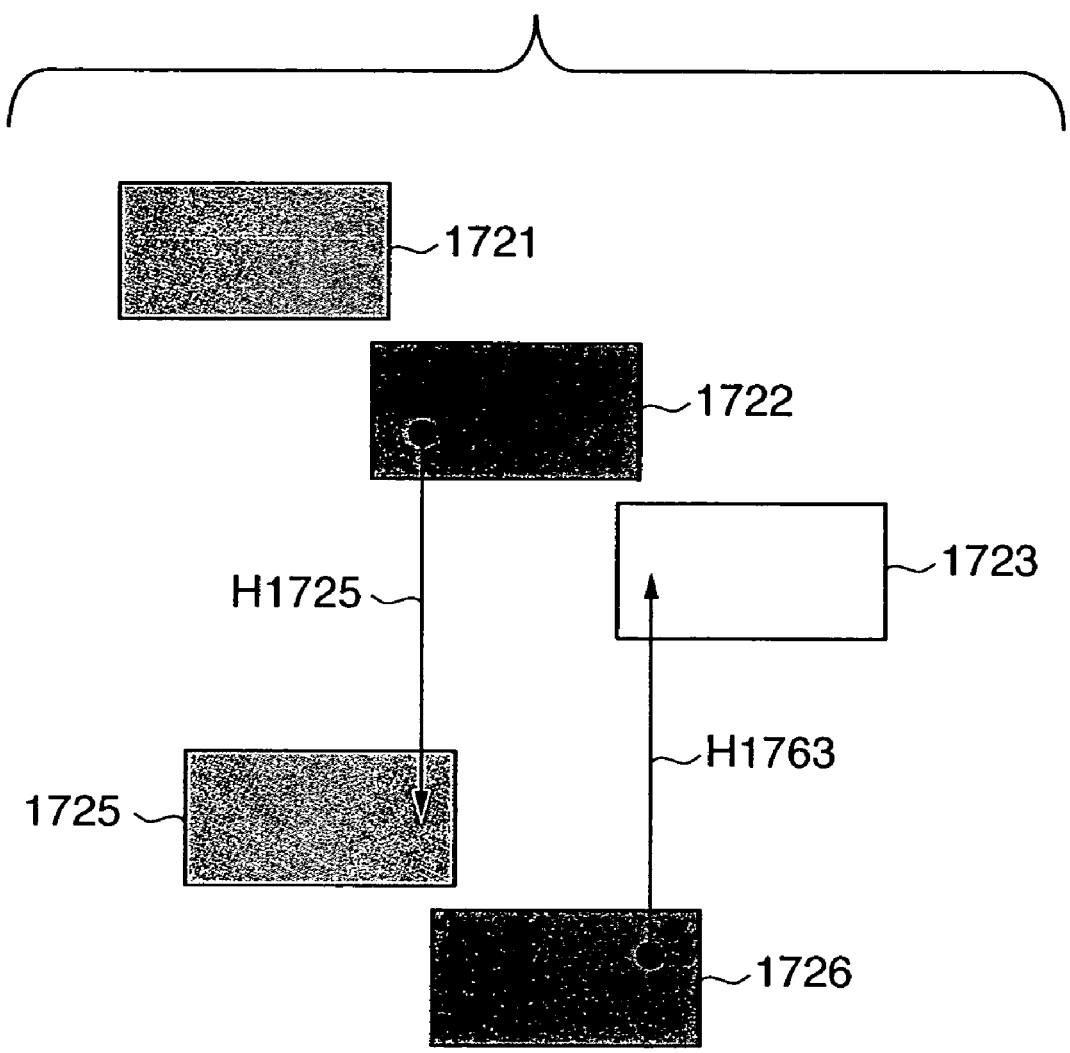
FIG. 20 is a view for explaining a conversion process in modification 1 of the second embodiment of the present invention.

More specifically, as shown in FIG. 20, let H1725 be a conversion required to adjust the hue or brightness of the image 1722 sensed by the camera 1702 before movement to the average value of those of the image 1722 and an image 1725 sensed by the camera 1701 after movement, and H1763 be a conversion required to adjust the hue or brightness of an image 1726 sensed by the camera 1702 after movement to the average value of those of the image 1726 and the image 1723 sensed by the camera 1703 before movement.

If the hue or brightness of an image has nearly no change during movement of the cameras, i.e., if the images 1721 and 1725 sensed by the camera 1701 before and after movement have nearly the same hue or brightness, and the images 1722 and 1726 sensed by the camera 1702 before and after movement have nearly the same hue or brightness, it can be considered that the conversion H1725 is substantially the same as a conversion H1721 required to adjust the hue or brightness of the image 1722 sensed by the camera 1702 before movement to the average value of those of the image 1722 and the image 1721 sensed by the camera 1701 before movement. Likewise, it can be considered that the conversion H1763 is substantially the same as a conversion H1723 required to adjust the hue or brightness of the image 1722 sensed by the camera 1702 before movement to the average value of those of the image 1722 and the image 1723 sensed by the camera 1703 before movement.

It is desirable to convert the color of the image 1722 sensed by the camera 1702 so that the hue or brightness of a portion which is closer to the seam with the image 1721 sensed by the camera 1701 becomes closer to the average value of those of the images 1721 and 1722, and the hue or brightness of a portion which is closer to the seam with the image 1723 sensed by the camera 1703 becomes closer to the average value of those of the image 1722 sensed by the camera 1702 and the image 1723 sensed by the camera 1703. For this purpose, as shown in FIG. 21, the image 1722 undergoes a conversion weighted based on H1725 and H1763 according to the distances from the two ends of the image to generate an image 1742. Let H172 be this conversion. Then, the conversion H172 is described by:

$$H172 = \beta \times H1725 + (1-\beta) \times H1763$$

where β is a value indicating the distance from the left, end when the left end of the image is β=0 and its right end is β=1 (0≦β≦1). Note that the conversion application method is not limited to this.

When the aforementioned process is applied to the images 1721, 1723, and 1724 respectively sensed by the cameras 1701, 1703, and 1704, the hue or brightness discontinuities at the seams upon generating a full-view panoramic image by compositing the images 1721 to 1724 can be reduced, and a natural full-view panoramic image can be obtained.

(Modification 2 of Second Embodiment)

This embodiment has explained only the case wherein images sensed after the cameras (image sensing unit 10) have moved a predetermined distance are used as reference images in the first embodiment. However, the present invention is not limited to this, and an arbitrary method which can sense an image corresponding to a reference image without using any reference image sensing camera can be applied. For example, images sensed by rotating the cameras in slightly different directions without changing their positions may be used.

This corresponds to a case wherein the panorama source image sensing cameras are used as the reference image sensing cameras in the first embodiment. Although the reference images and panorama source images are sensed at different times, images sensed in this way can be used as reference images sensed at substantially the same time as long as the hue or brightness of a visual scene has not largely deviated during that time difference.

More specifically, if the image sensing unit 10 with the camera layout shown in, e.g., FIG. 14 is used, panorama source images are sensed by the cameras 1201 and 1202. Next, these cameras are rotated a predetermined angle (e.g., 45°), e.g., counterclockwise, and another image is sensed by the camera 1202.

In step S1301 in FIG. 15, a conversion required to adjust the hue or brightness of each panorama source image to that of an image which is sensed by the camera 1202 after rotation and has overlapping portions with the visual fields of the two cameras before rotation is calculated. In step S1302, that conversion is applied to the image sensed by the panoramic image sensing camera before rotation. The same applies to the case wherein a full-view visual scene is captured within the visual field using the four cameras.

Note that the rotation angle of each camera may be arbitrarily determined as long as a visual field which has overlapping portions with those of two cameras used to sense neighboring panorama source images can be obtained.

As described above, according to this embodiment, upon compositing two images having an overlapping portion, these images are composited after they are converted in correspondence with an image which is sensed by a camera having a visual field that has overlapping portions with both the visual fields of the cameras used to sense these two images. Therefore, even when images which have nearly no overlapping portions are to be composited, a panoramic image in which the hue or brightness discontinuities are reduced, and which has an inconspicuous seam can be generated.

Note that this embodiment has explained only the case wherein the image sensing unit that senses a full-view visual scene by the four cameras is used. However, an arbitrary number of panorama source image sensing cameras can be used in the image sensing unit as long as two or more cameras are arranged. Also, each camera used in this embodiment may be either a camera that senses a moving image or a camera that senses a still image. When panoramic images are to be successively generated using moving image sensing cameras, the process according to this embodiment need not always be applied to each image frame. For example, the process of this embodiment need only be executed when the hue or brightness of an image has largely deviated from a threshold value due to changes in illumination condition and the like.

ANOTHER EMBODIMENT

The above embodiments have explained only the case wherein a plurality of images are composited in the horizontal direction. However, the present invention can be applied to a case wherein a plurality of images are composited in the vertical direction, i.e., a plurality of images having upper and lower overlapping portions are composited.

In the above embodiments, the hue or brightness is adjusted. Alternatively, both the hue and brightness may be adjusted.

In the above embodiments, only the image processing unit which consists of a single device has been explained. However, the present invention may be implemented by a system which is formed by a plurality of devices having functions equivalent to those of the image processing unit of the present invention.

Note that the present invention includes a case wherein the equivalent functions are achieved by supplying a software program that implements the functions of the aforementioned embodiments (programs corresponding to one or more flow charts described in the embodiments) directly from a recording medium or using wired/wireless communications to a system or apparatus having a computer that can execute the program, and executing the supplied program by the computer of that system or apparatus.

Therefore, the program code itself supplied to and installed in the computer to implement the functional process of the present invention using the computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As the recording medium for supplying the program, for example, magnetic recording media such as a flexible disk, hard disk, magnetic tape, and the like, optical/magnetooptical storage media such as an MO, CD-ROM, CD-R, CD-RW, DVD-ROM, DVD-R, DVD-RW, and the like, a nonvolatile semiconductor memory, and so forth may be used.

As a program supply method using the wired/wireless communications, a server on a computer network may store a data file (program data file) that can be a computer program which forms the present invention on a client computer, such as the computer program itself which forms the present invention, a compressed file including an automatic installation function, or the like, and the program data file may be downloaded to the client computer which establishes connection to the server. In this case, the program data file may be segmented into a plurality of segment files, which may be allocated on different servers.

That is, the present invention includes a server apparatus which makes a plurality of users download the program data file for implementing the functional process of the present invention on a computer.

Also, a storage medium such as a CD-ROM or the like, which stores the encrypted program of the present invention, may be delivered to the user, the user who has cleared a predetermined condition may be allowed to download key information that is used to decrypt the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

As described above, according to the present invention, the hue or brightness discontinuities generated at the seams of source images can be reduced from a composite image generated by compositing a plurality of images.

As many apparently widely different embodiments of the present invention can be made without departing from the spirit and scope thereof, it is to be understood that the invention is not limited to the specific embodiments thereof except as defined in the appended claims.

What is claimed is:

1. An image processing method for generating a full-view panoramic image by compositing a plurality of images each of which has overlapping portions with neighboring images, comprising the steps of:
    acquiring, when an arbitrary one of the plurality of images is defined as a first image, and images to be composited as right and left neighboring images of the first image are defined as second and third images, a first reference image having overlapping portions with both the first and second images, and a second reference image having overlapping portions with both the first and third images;
    calculating first and second conversion conditions required to adjust a hue or brightness level of the first image to hue or brightness levels of the first and second reference images;
    generating a converted image by converting a left predetermined region of the first image on the basis of the first conversion condition and converting a right predetermined region of the first image on the bases of the second conversion condition, and
    generating a full-view panoramic image by compositing the converted images generated for all of the plurality of images,
    wherein the conversions based on the first and second conversion conditions are weighted depending on distances from right and left ends of the first image.

2. The method according to claim 1, wherein the first and second reference images are generated from one image.

3. A computer-readable storage medium storing a computer program that makes a computer execute an image processing method for generating a full-view panoramic image by compo siting a plurality of images each of which has overlapping portions with neighboring images, said computer program comprising:
    code of a step of acquiring, when an arbitrary one of the plurality of images is defined as a first image, and images to be composited as right and left neighboring images of the first image are defined as second and third images, a first reference image having overlapping portions with both the first and second images, and a second reference image having overlapping portions with both the first and third images;
    code of a step of calculating first and second conversion conditions required to adjust a hue or brightness level of the first image to hue or brightness levels of the first and second reference images;
    code of a step of generating a converted image by converting a left predetermined region of the first image on the basis of the first conversion condition and converting a right predetermined region of the first image on the basis of the second conversion condition; and
    code of a step of generating a full-view panoramic image by compositing the converted images generated for all of the plurality of images,
    wherein the conversions on the basis of the first and second conversion conditions are weighted depending on distances from right and left ends of the first image.

4. An image processing apparatus for generating a full-view panoramic image by compositing a plurality of images each of which has overlapping portions with neighboring images, comprising:
    an acquiring unit adapted to, when an arbitrary one of the plurality of images is defined as a first image, and images to be composited as right and left neighboring images of the first image are defined as second and third images, acquire a first reference image having overlapping portions with both the first and second images, and a second reference image having overlapping portions with both the first and third images;
    a calculating unit adapted to calculate first and second conversion conditions required to adjust a hue or brightness level of the first image to hue or brightness levels of the first and second reference images;
    a first generating unit adapted to generate a converted image by converting a left predetermined region of the first image on the basis of the first conversion condition and converting a right predetermined region of the first image on the basis of the second conversion condition; and
    a second generating unit adapted to generate a full-view panoramic image by compositing the converted images generated for all of the plurality of images,
    wherein, in said first generating unit, the conversions on the basis of the first and second conversion conditions are weighted depending on distances from the right and left ends of the first image.

* * * * *

UNITED STATES PATENT AND TRADEMARK OFFICE
CERTIFICATE OF CORRECTION

PATENT NO. : 7,388,982 B2  
APPLICATION NO. : 10/721875  
DATED : June 17, 2008  
INVENTOR(S) : Takaaki Endo et al.

Page 1 of 1

It is certified that error appears in the above-identified patent and that said Letters Patent is hereby corrected as shown below:

<u>COLUMN 15</u>

Line 6, "left, end" should read --left end--.

<u>COLUMN 12</u>

Line 28, "sensing-unit" should read --sensing unit--.

<u>COLUMN 18</u>

Line 6, "compo siting" should read --compositing--.

Signed and Sealed this

Twenty-fourth Day of March, 2009

JOHN DOLL  
*Acting Director of the United States Patent and Trademark Office*